(12) United States Patent
Norin et al.

(10) Patent No.: US 7,693,483 B1
(45) Date of Patent: Apr. 6, 2010

(54) METHOD AND SYSTEM FOR OPERATING A SATELLITE COMMUNICATION SYSTEM WITH REGIONAL REDUNDANT SITES AND A CENTRAL SITE

(75) Inventors: John L. Norin, Redondo Beach, CA (US); Cecilia C. Comeaux, Redondo Beach, CA (US); Benjamin Mui, Redondo Beach, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 0 days.

(21) Appl. No.: 11/529,840

(22) Filed: Sep. 29, 2006

(51) Int. Cl.
*H04Q 7/20* (2006.01)

(52) U.S. Cl. .................. 455/12.1; 455/3.01; 455/3.02; 455/3.04; 455/3.06; 455/427; 725/62; 725/63; 725/64; 725/65; 725/66

(58) Field of Classification Search ............. 455/3.01, 455/3.02, 3.04, 3.03–3.06, 427, 428, 429, 455/466, 422.1, 403, 500, 517, 12.1; 725/62–68
See application file for complete search history.

(56) References Cited

U.S. PATENT DOCUMENTS

| | | |
|---|---|---|
| 4,882,743 A | 11/1989 | Mahmoud |
| 5,463,656 A | 10/1995 | Polivka et al. |
| 5,640,673 A | 6/1997 | Tanabe |
| 5,949,766 A | 9/1999 | Ibanez-Meier et al. |
| 6,256,496 B1 * | 7/2001 | Dintelmann et al. ........ 455/427 |
| 6,333,922 B1 | 12/2001 | Campanella |
| 6,373,817 B1 | 4/2002 | Kung et al. |
| 6,400,720 B1 | 6/2002 | Ovadia et al. |
| 6,498,922 B1 | 12/2002 | Lazaris-Brunner et al. |
| 6,944,139 B1 | 9/2005 | Campanella |
| 7,088,981 B2 | 8/2006 | Chang |
| 7,133,377 B1 | 11/2006 | Mullins et al. |
| 7,260,369 B2 | 8/2007 | Feher |
| 7,346,918 B2 | 3/2008 | Hennenhoefer et al. |
| 2001/0026537 A1 | 10/2001 | Massey |
| 2003/0109249 A1 * | 6/2003 | Frantz ........................ 455/414 |
| 2006/0048197 A1 | 3/2006 | Petruzelli |
| 2007/0010254 A1 * | 1/2007 | Regan et al. ................ 455/445 |

* cited by examiner

*Primary Examiner*—Keith T Ferguson

(57) ABSTRACT

A method and system for operating a satellite communication system with regional redundant sites and a central site includes a satellite and a regional site uplinking regional uplink signals to the satellite and condition signals to a terrestrial communication link. The satellite generates regional downlink signals from the regional uplink signal. A central site receives the regional downlink signals from the satellite and terrestrially receives the condition signals and generates control signals for the regional site through the terrestrial communication link.

21 Claims, 26 Drawing Sheets

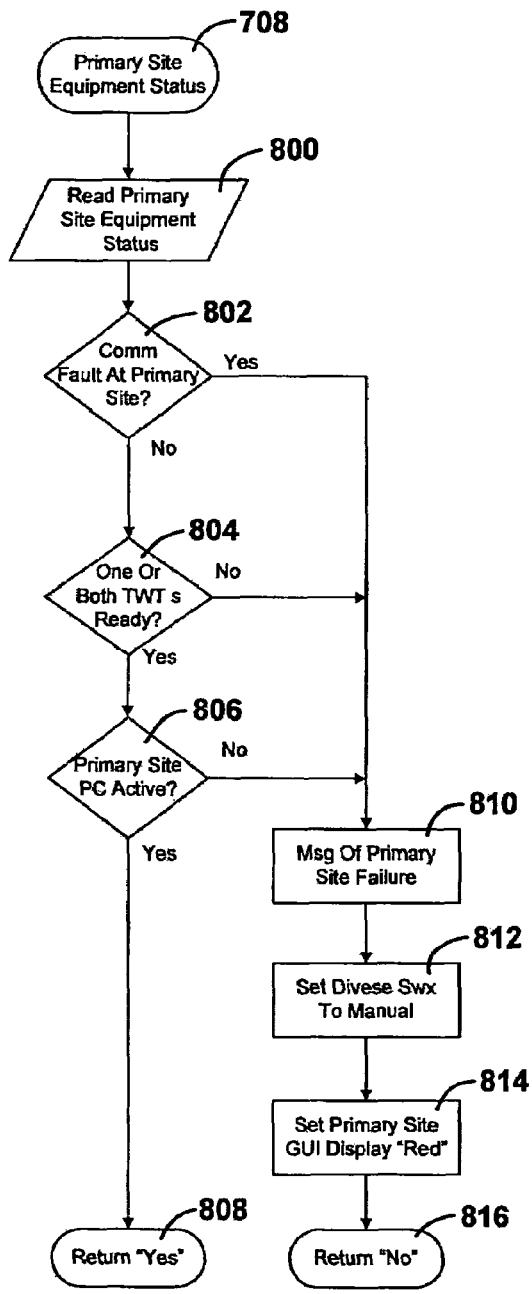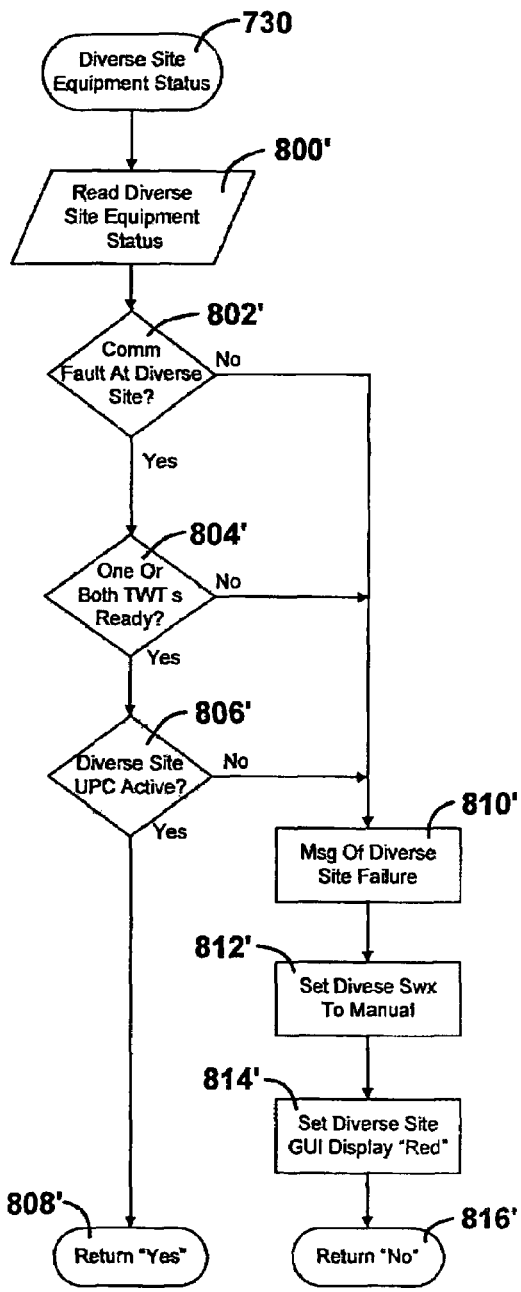
FIG. 8A
FIG. 8B

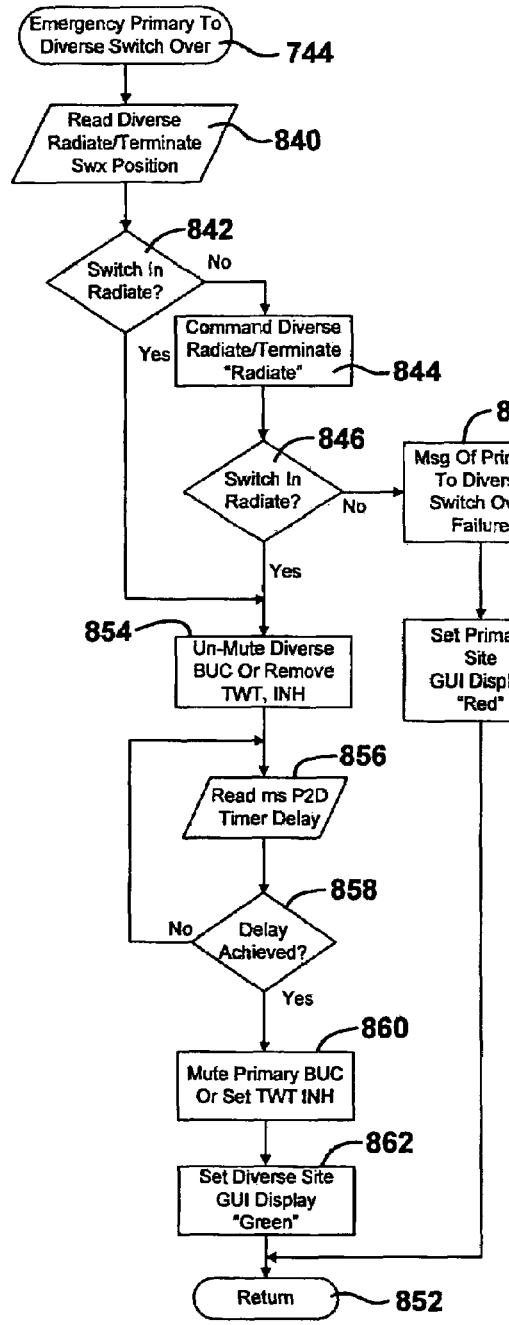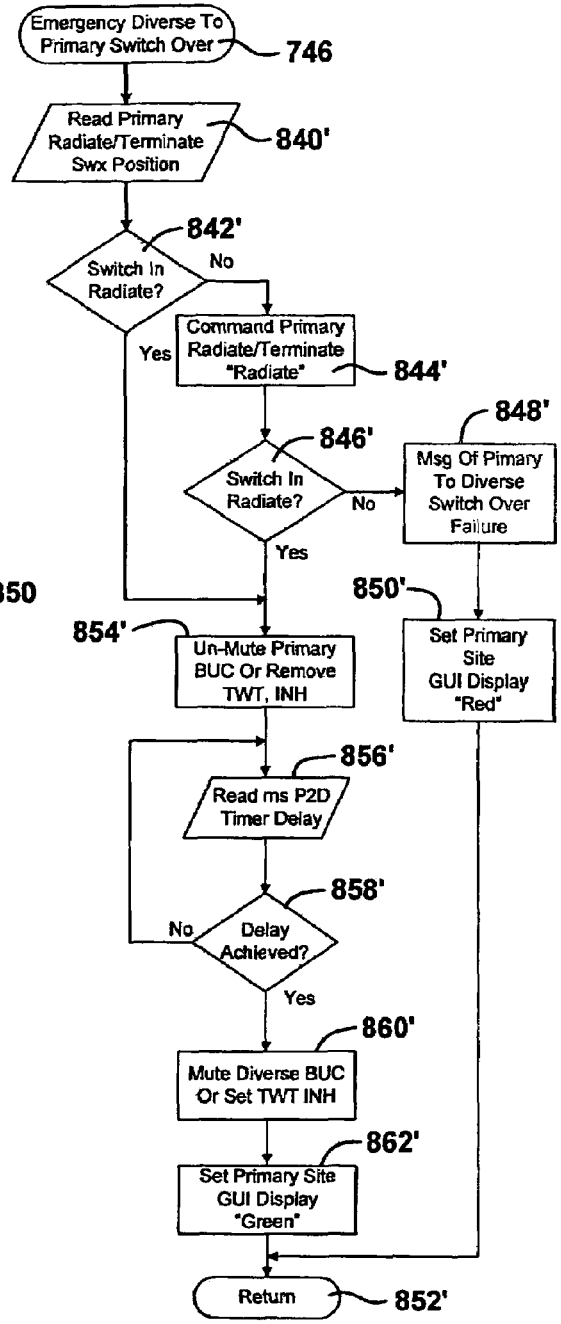
FIG. 9A  FIG. 9B

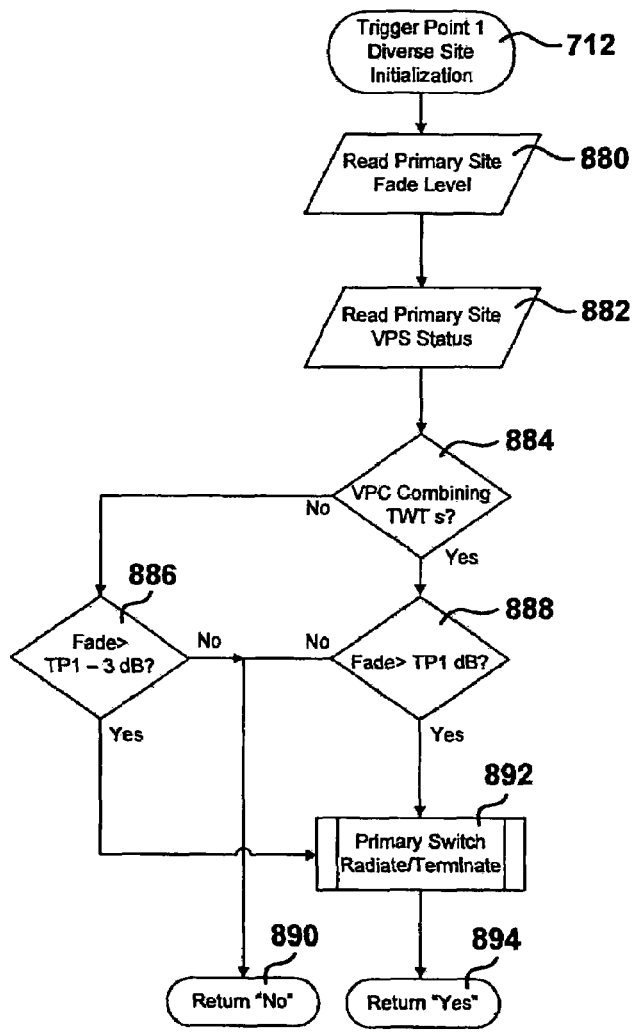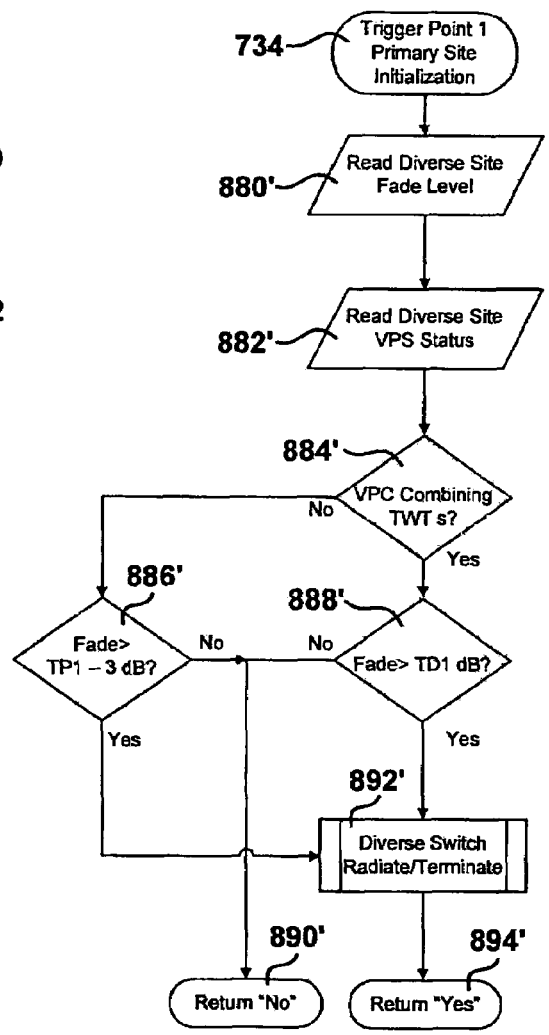
FIG. 10A    FIG. 10B

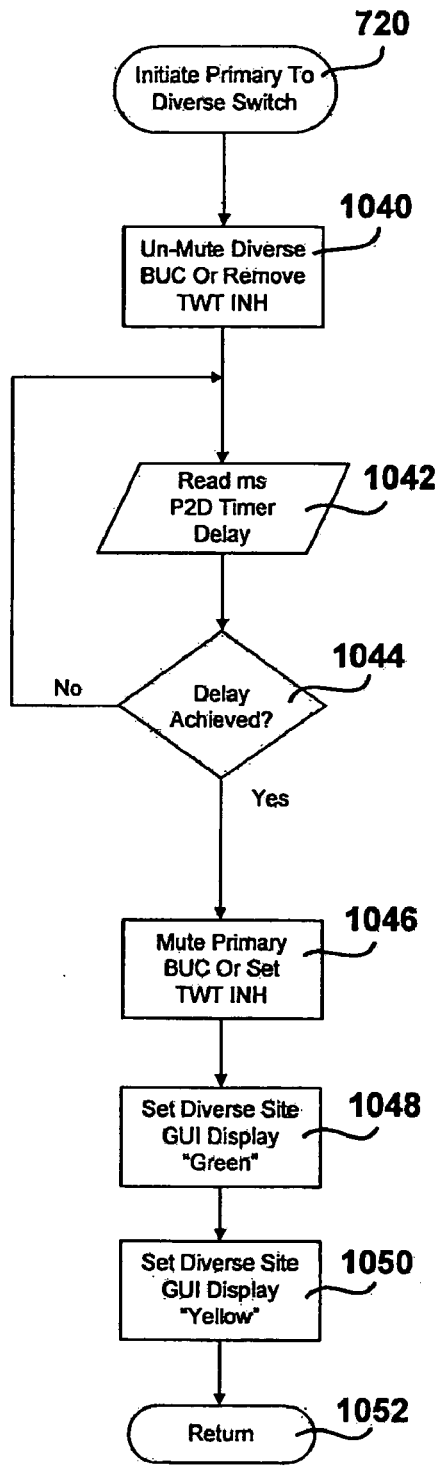
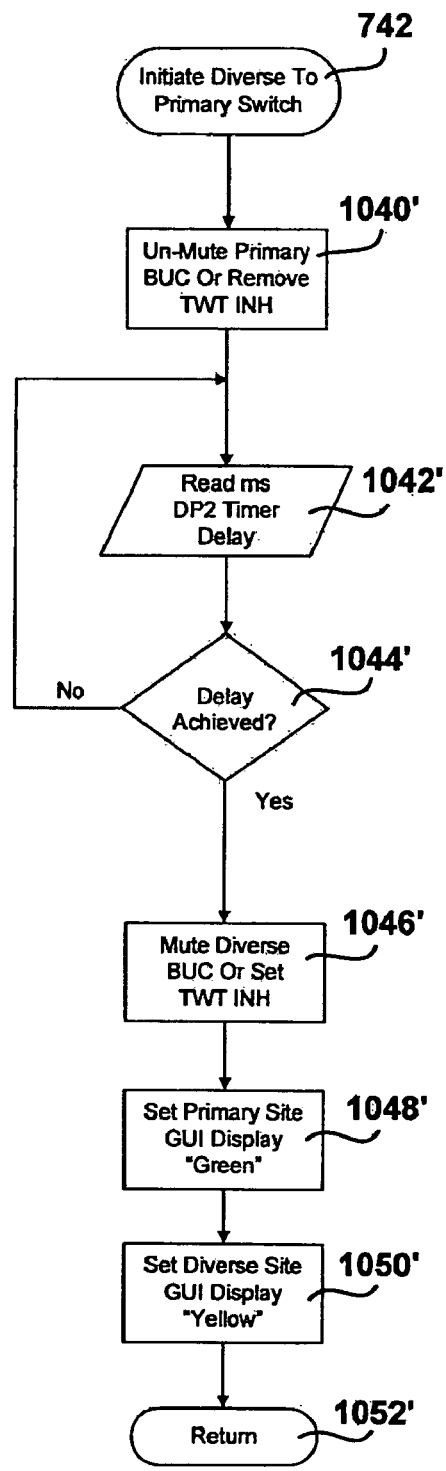
FIG. 14A  FIG. 14B

METHOD AND SYSTEM FOR OPERATING A SATELLITE COMMUNICATION SYSTEM WITH REGIONAL REDUNDANT SITES AND A CENTRAL SITE

CROSS-REFERENCES TO RELATED APPLICATIONS

This application is related to Utility application Ser. Nos. 11/529,932, 11/529,915, 11/529,949, 11/529,950, 11/529,918, and 11/540,037, all filed simultaneously herewith on Sep. 29, 2006. The disclosures of the above applications are incorporated by reference herein.

TECHNICAL FIELD

The present disclosure relates generally to satellite communication systems, and more particularly to a method and system for operating a satellite communication system with regional redundant sites and a central site.

BACKGROUND

The statements in this section merely provide background information related to the present disclosure and may not constitute prior art.

Satellite broadcasting of television signals has increased in popularity. Satellite television providers continually offer more and unique services to their subscribers to enhance the viewing experience. Providing reliability in a satellite broadcasting system is therefore an important goal of satellite broadcast providers.

Using a redundant site for uplinking is known. However, reliability in such sites may still be compromised and, thus, the service may be perceived as less than reliable.

SUMMARY

In one aspect of the disclosure, a system includes a satellite, a regional site uplinking regional uplink signals to the satellite and condition signals to a terrestrial communication link. The satellite generates regional downlink signals from the regional uplink signal. A central site receives the regional downlink signals from the satellite and terrestrially receives the condition signals and generates control signals for the regional site through the terrestrial communication link.

In a further aspect of the disclosure, a method includes uplinking regional uplink signals to a satellite, uplink condition signals to a terrestrial communication link, generating regional downlink signals at the satellite from the regional uplink signal, receiving the regional downlink signals at a central site, receiving the condition signals at a central site and communicating and generating control signals for the regional site through the terrestrial communication link at the central site.

One advantage of the disclosure is that by distributing the uplinking signals with both primary and diverse sites at various regions and at a central site, more reliable satellite signals may be received by the various users.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

FIGS. 8A and 8B are flowcharts for determining a primary site equipment status and a diverse site equipment status, respectively.

FIGS. 9A and 9B are flowcharts of an emergency primary to diverse or diverse to primary emergency switchover, respectively.

FIGS. 10A and 10B are flowcharts of a diverse site initialization and a primary site initialization, respectively.

FIGS. 14A and 14B are flowcharts of a primary to diverse site switch or diverse to primary site switch, respectively.

FIG. 19B is a timing chart showing the primary site signal and secondary site signal after error correction.

DETAILED DESCRIPTION

Figure 1:
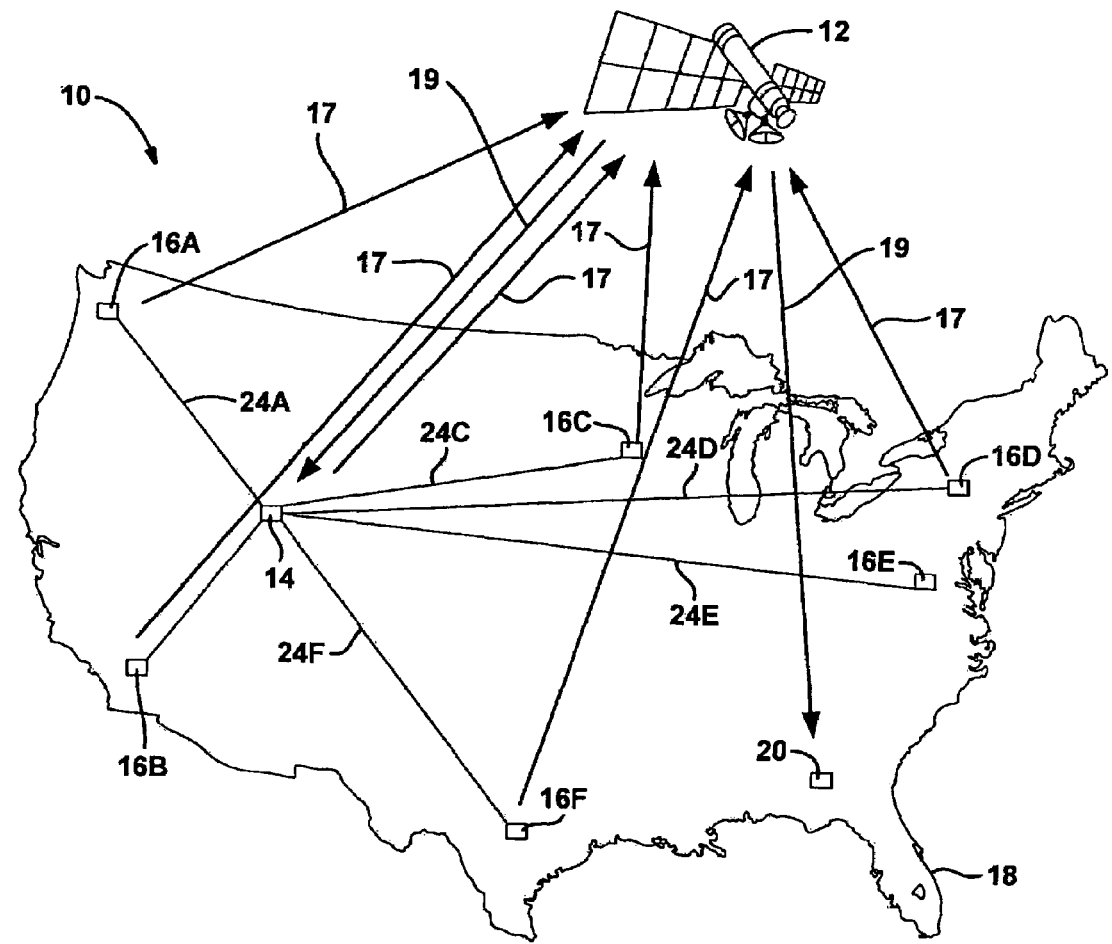
FIG. 1 is an overall system view of a satellite communication system in the continental United States.

The following description is merely exemplary in nature and is not intended to limit the present disclosure, application, or uses. It should be understood that throughout the drawings, corresponding reference numerals indicate like or corresponding parts and features.

The present disclosure is described with respect to a satellite television system. However, the present disclosure may have various uses including satellite transmission and data transmission and reception for home or business uses.

Referring now to FIG. 1, a communication system 10 includes a satellite 12. The communication system 10 includes a central facility 14 and a plurality of regional facilities 16A, 16B, 16C, 16D, 16E and 16F. Although only one satellite is shown, more than one is possible. The regional facilities 16A-16F may be located at various locations throughout a landmass 18 such as the continental United States, including more or less than those illustrated. The regional facilities 16A-16F uplink various uplink signals 17 to satellite 12. The satellites downlink downlink signals 19 to various users 20 that may be located in different areas of the landmass 18. The users 20 may be mobile or fixed users. The uplink signals 17 may be digital signals such as digital television signals or digital data signals. The digital television signals may be high definition television signals. Uplinking may be performed at various frequencies including Ka band. The present disclosure, however, is not limited to Ka band. However, Ka band is a suitable frequency example used throughout this disclosure. The central facility 14 may also receive downlink signals 19 corresponding to the uplink signals 17 from the various regional facilities and from itself for monitoring purposes. The central facility 14 may monitor the quality of all the signals broadcast from the system 10.

The central facility 14 may also be coupled to the regional facilities through a network such as a computer network having associated communication lines 24A-24F. Each communication line 24A-F is associated with a respective regional site 16. Communication lines 24A-24F are terrestrial-based lines. As will be further described below, all of the functions performed at the regional facilities may be controlled centrally at the central facility 14 as long as the associated communication line 24A-F is not interrupted. When a communication line 24A-F is interrupted, each regional site 16A-F may operate autonomously so that uplink signals may continually be provided to the satellite 12. As will be described below, the central facility 14 may include graphic user interfaces that are identical to those of the regional site 16 so that control and monitoring can take place at the various regional facilities. Each of the regional and central facilities includes a transmitting and receiving antenna which is not shown for simplicity in FIG. 1.

Figure 2:
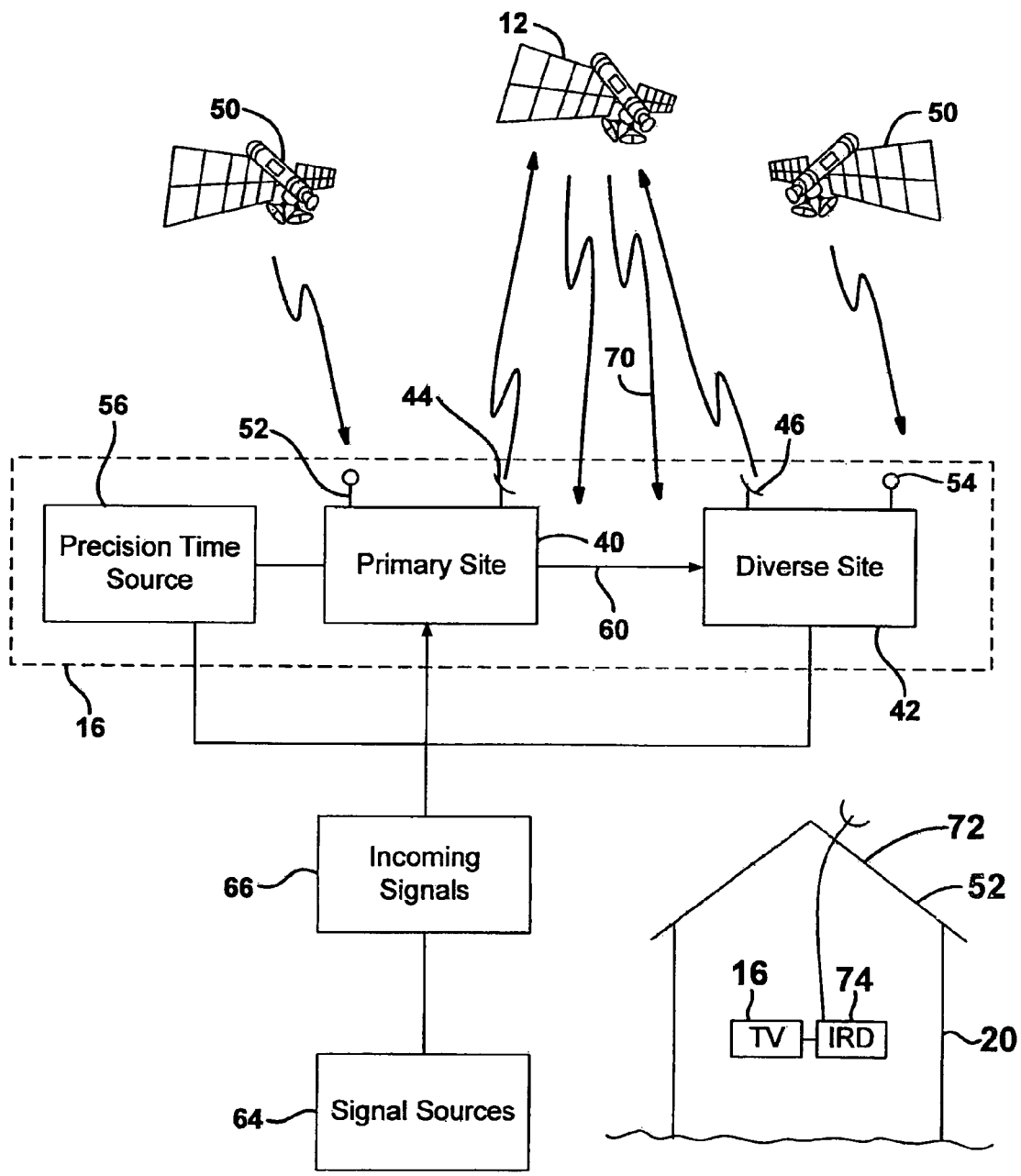
FIG. 2 is a system view at the regional level of a satellite system.

Referring now to FIG. 2, the regional facilities 16A-16F are illustrated collectively as reference numeral 16. The regional site 16 may actually comprise two facilities that include a primary site 40 and a diverse site 42. As will be described below, the central site 14 may also include a primary site and diverse site as is set forth herein. The primary site 40 and diverse site 42 of both the central and regional sites are preferably separated by at least 25 miles, or, more preferably, at least 40 miles. In one constructed embodiment, 50 miles was used. The primary site 40 includes a first antenna 44 for transmitting and receiving signals to and from satellite 12. Diverse site 42 also includes an antenna 46 for transmitting and receiving signals from satellite 12.

Primary site 40 and diverse site 42 may also receive signals from GPS satellites 50. GPS satellites 50 generate signals corresponding to the location and a precision timed signal that may be provided to the primary site 40 through an antenna 52 and to the diverse site 42 through an antenna 54. It should be noted that redundant GPS antennas (52A,B) for each site may be provided as illustrated in FIG. 5. In some configurations, antennas 44 and 46 may also be used to receive GPS signals.

A precision time source 56 may also be coupled to the primary site 40 and to the diverse site 42 for providing a precision time source. The precision time source 56 may include various sources such as coupling to a central atomic clock.

The primary site 40 and the diverse site 42 may be coupled through a communication line 60. Communication line 60 may be a dedicated communication line. The primary site 40 and the diverse site 42 may communicate over the communication line using a video over internet protocol (IP).

Various signal sources 64 such as an optical fiber line or copper line may provide incoming signals 66 from the primary site 40 to the diverse site 42. Incoming signal 66, as mentioned above, may be television signals. The incoming signals 66 such as the television signal may be routed from the primary site 40 through the communication line 60 to the diverse site 42 in the event of a switchover whether the switchover is manual or a weather-related automatic switchover. A manual switchover, for example, may be used during a maintenance condition.

Users 20 receive downlink signals 70 corresponding to the television signals. Users 20 may include home-based systems or business-based systems, both mobile and fixed. As illustrated, a user 20 has a receiving antenna 72 coupled to an integrated receiver decoder 74 that processes the signals and generates audio and video signals corresponding to the received downlink signal 70 for display on the television or monitor 76. It should also be noted that satellite radio systems may also be used in place of an IRD and TV for use of the satellite signals.

Figure 3A:
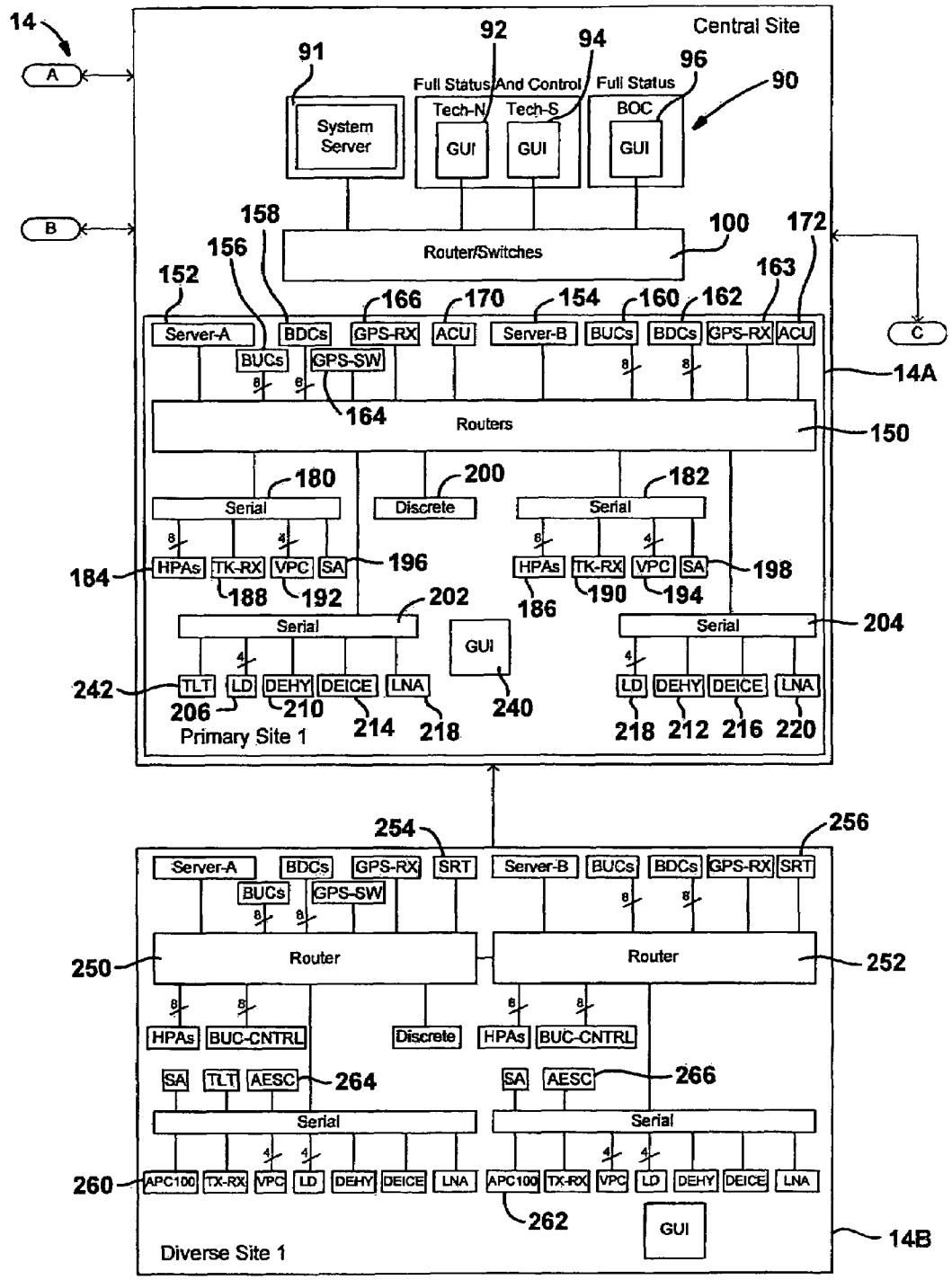
FIGS. 3A, 3B and 3C are block diagrammatic views of the systems illustrated in FIGS. 1 and 2.
Figure 3B:
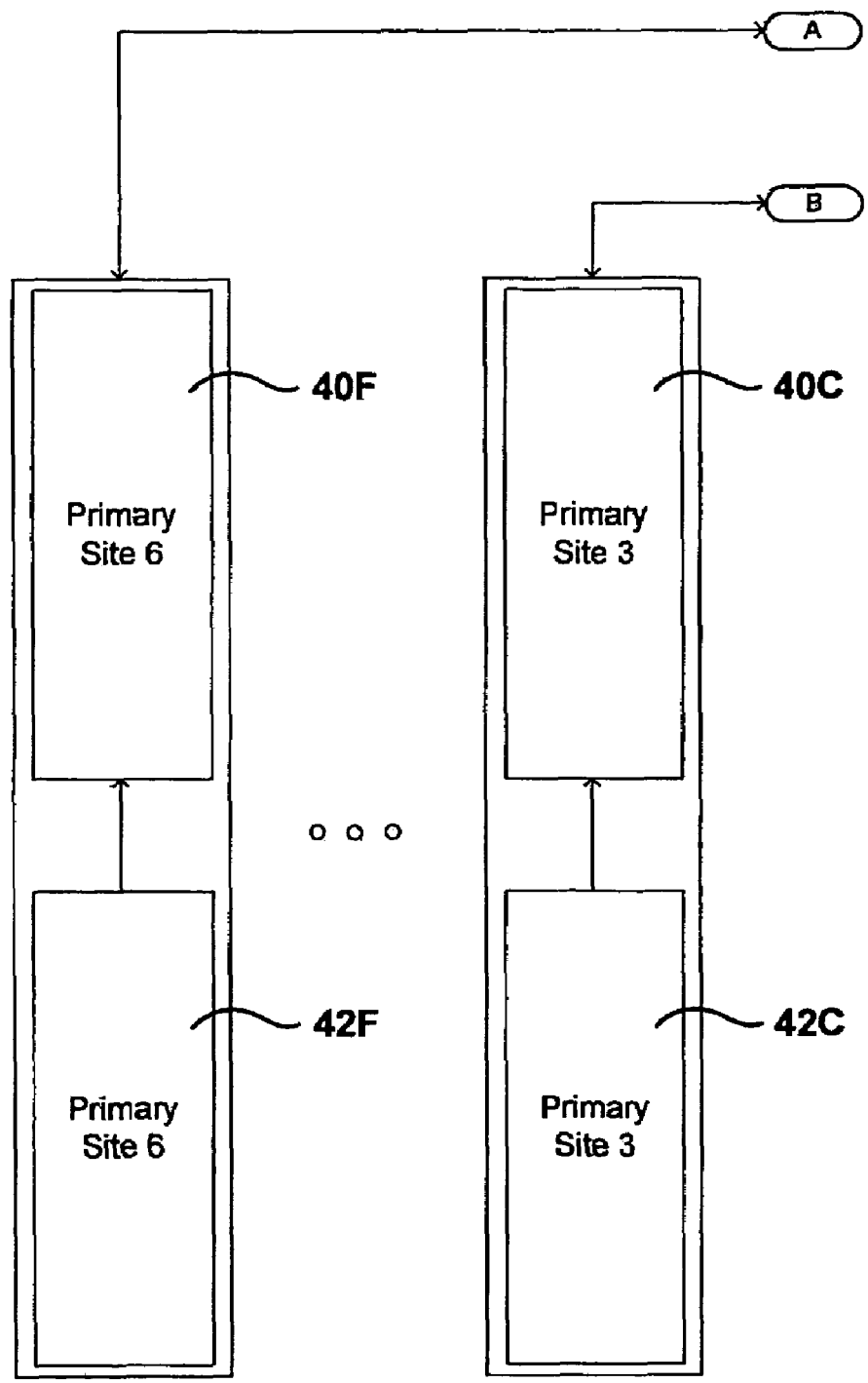
Figure 3C:
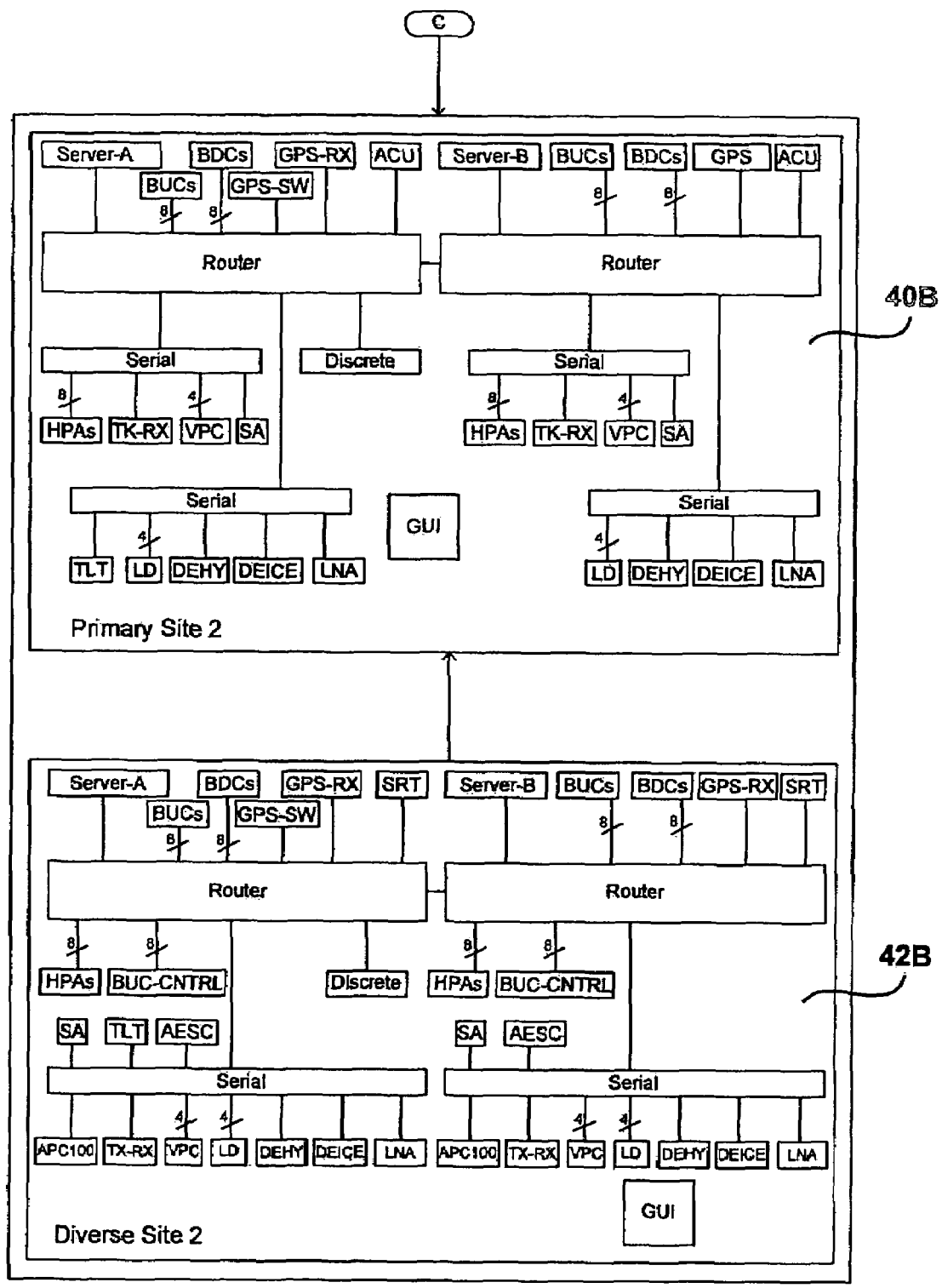

Referring now to FIGS. 3A, 3B and 3C, block diagrammatic views of the control system of the communication system of the present disclosure are illustrated. In FIG. 3, the central site 14 includes the primary site 14A and the diverse site 14B. A monitoring module 90 is illustrated located at the primary central site 14A. Those skilled in the art will recognize that the monitoring module 90 may be located in various locations including separately from the primary site.

Monitor module 90 may include a system server 91 and displays 92, 94 and 96 that display graphical user interfaces for status and control of various functions that will be further described below. The server system 91 is a controller that may control the overall system function. The server may generate control signals that act as a switch. The switches or switch functions may be performed in software alone or in conjunction with various relays or other suitable hardware that corresponds to the particular equipment controlled. The switch of various system components is performed in response to various monitored conditions. The displays 92, 94 and 96 may be formed on multiple monitor screens or on different monitor screens. The status and control monitoring may be able to monitor and control the elements in the RF chain and various other conditions associated with satellite transmission and reception.

The server 91, the displays 92, 94 and 96 may be coupled to a router 100. The router 100 may receive information from the various primary and diverse sites for display on the graphical user interfaces so that an operator may easily control various functions at the diverse sites. The router 100 may, therefore, act as a switch or a number of switches for routing various input and output signals.

The primary site and the diverse site for each of the central site and the remote sites may be configured identically or nearly identically. Each of the sites includes a router 150 that has various elements coupled thereto. It should be noted that various elements may be coupled twice to provide redundancy in the system. For example, a server 152 is coupled to router 150. A second server 154 is also coupled to router 150 to provide redundancy to the first server 152. The servers 152, 154 may act as a controller to switch on and off various components of the system in response to monitored condition signals. Block upconverters 156 and block downconverters 158, as well as block upconverters 160 and block downconverters 162, are coupled to the router 150. A global positioning switch 164 and a global positioning system receiver 166 are also coupled to the router. A second global positioning receiver 168 is coupled to router 150. An antenna control unit 170 and a second antenna control unit 172 are also coupled to the router 150. The router 150 may also receive information from various elements in the receive and transmit chain. The router 150 may route these receive signals to the various servers 152 and 154 for processing and control purposes. The router 150, for example, may receive information through a first serial port 180 and a second serial port 182. The serial ports may be coupled to high-power amplifiers 184, 186, tracking receive interface 188, 190, variable power combined amplifiers 192, 194 and spectrum analyzer 196, 198.

The router 150 may also be discretely wired to various input sources through a discrete input 200. A second and third redundant serial port 202 and 204 may be respectively coupled to line drivers 206, 208, dehydrator 210, 212, device control 214, 216 and low noise amplifier 218, 220. A graphical user interface 240 may be used to monitor the various conditions of the various devices in the RF chain. The function of these devices will be further described below. In addition, a test loop translator 242 may also be coupled to one of the serial ports 202, 204. The test loop translator 242 may provide an input and output carried out by the waveguide and coaxial switches.

The configuration of the primary site 40B may be identical to that of the primary site 14A. The diverse sites may also be configured in a similar manner and have the same inputs 152 through 172. In this case, router 150 is divided up into two routers 250 and 252. A subreflector tracker SRT input 254 and 256 may be provided at each router so that the subreflector tracking may be performed. An antenna-programmable controller (APC) 260 and 262 may be coupled to each serial port which is coupled to each router 250, 252. In addition, an antenna environmental system (AES) controller 264, 266 may also be coupled to the serial port for input to the router 250, 252. The remaining elements of the diverse site are identical to those above in the primary site. The diverse site 14B may be exactly identical to that of diverse site 42B and the other diverse sites in the system.

Figure 4:
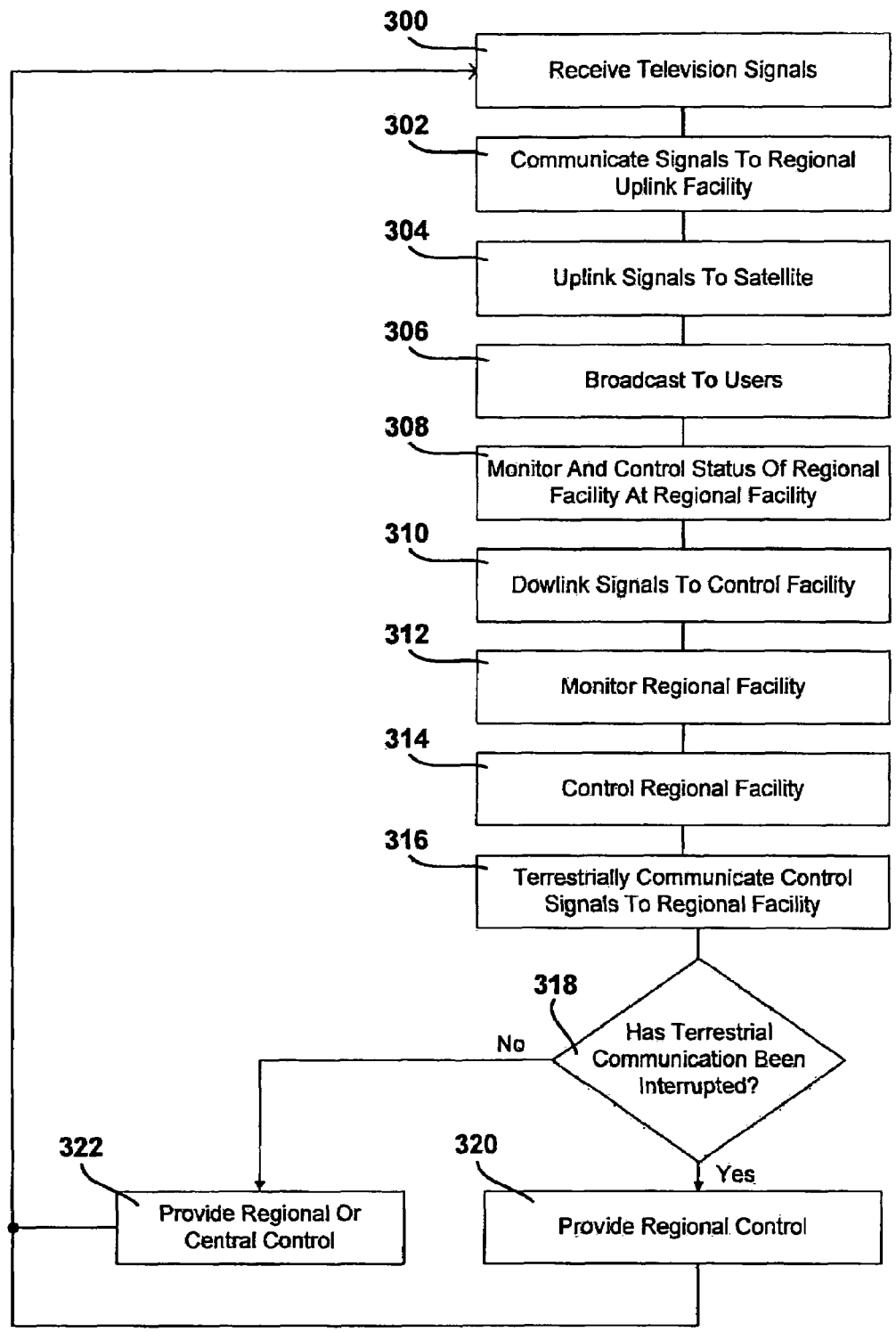
FIG. 4 is a flowchart illustrating a method of operating the system illustrated in FIG. 3.

Referring now to FIG. 4, a method of operating the overall communication system is set forth. In step 300, signals such as television signals are received. Of course, various types of signals, including radio or data signals, may be used. As mentioned above, the television signals may be received from various collection points and transmitted to the regional facilities. The television signals may be received in many ways including over-the-air terrestrial-based or through optical fibers. That is, in step 302 the television signals may be communicated to the regional uplink facility. In step 304, the television signals may be uplinked to the satellite. In step 306, the television signals may be broadcast to various users from the satellites using various types of transmission methods including spot beams. In step 308, the control status of the regional site 16 may be monitored or controlled at the regional site 16. In step 310, the signals broadcast to the various users may also be downlinked at the central facility. The central facility may monitor the quality of the signals. In step 312, the regional site 16 itself may be monitored through the graphical user interface as described above. The same graphical user interfaces provided at the regional facilities, may be provided at the central facility so that various systems may be monitored. It should be noted that the monitoring of the regional site 16 and the controls therein, may be performed over a terrestrial communication line as described above. The communication line may be a dedicated communication line or an internet-type network communication line.

In step 314, the regional site 16 may be controlled using the terrestrial communication line described above. The changing of various settings for various RF controls may be set forth and monitored.

In step 316, the control signals are terrestrially communicated to the regional site 16. In step 318, if the terrestrial communication has been interrupted, regional control may be the only source of control for the regional facilities in step 320. In step 318, if terrestrial communication has not been interrupted, local regional control or central control may be performed in step 322. After steps 322 and 320, the system returns back to step 300.

Figure 5A:
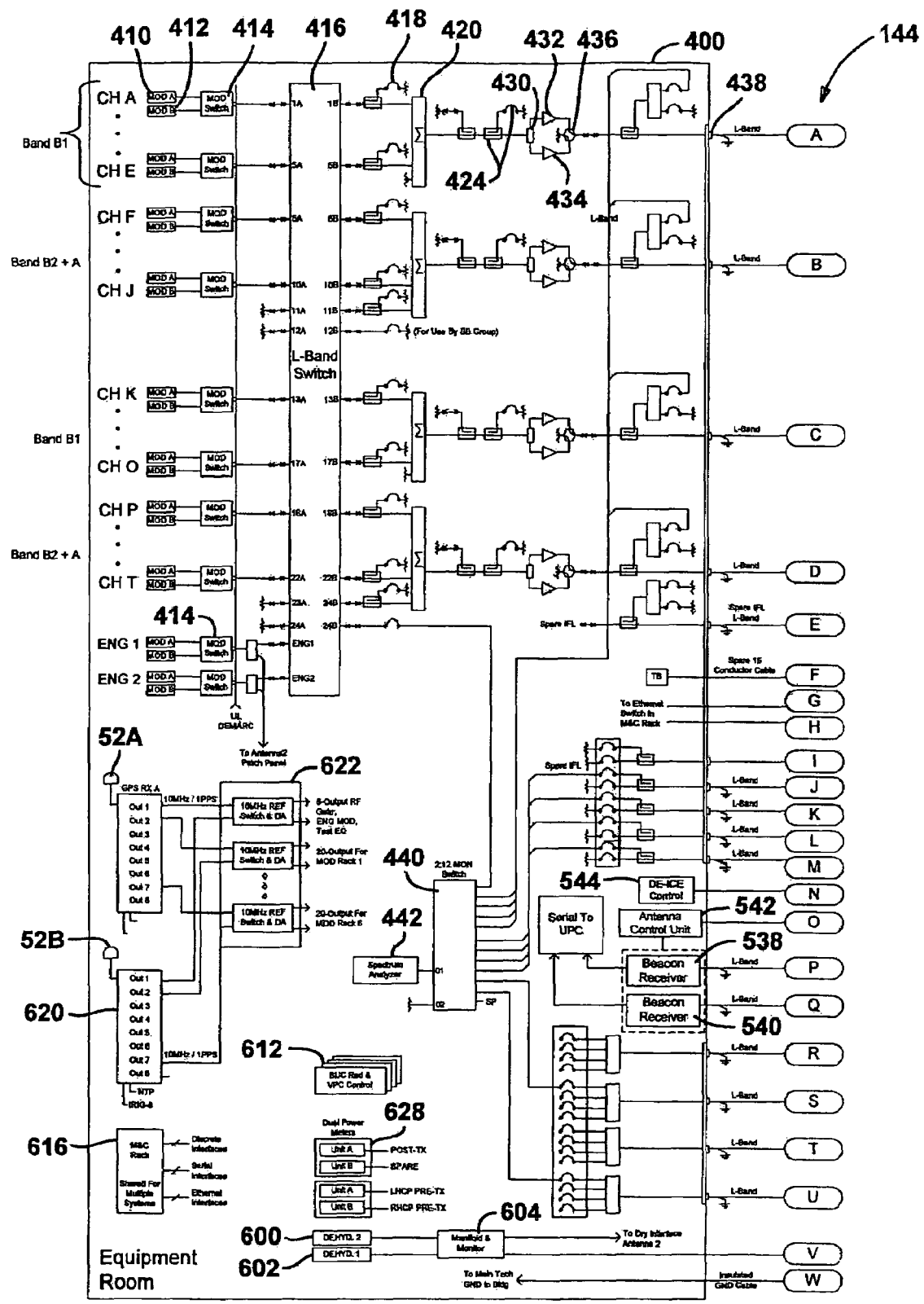
FIGS. 5A and 5B are schematic views of a primary or diverse site illustrated in FIGS. 3A-C.
Figure 5B:
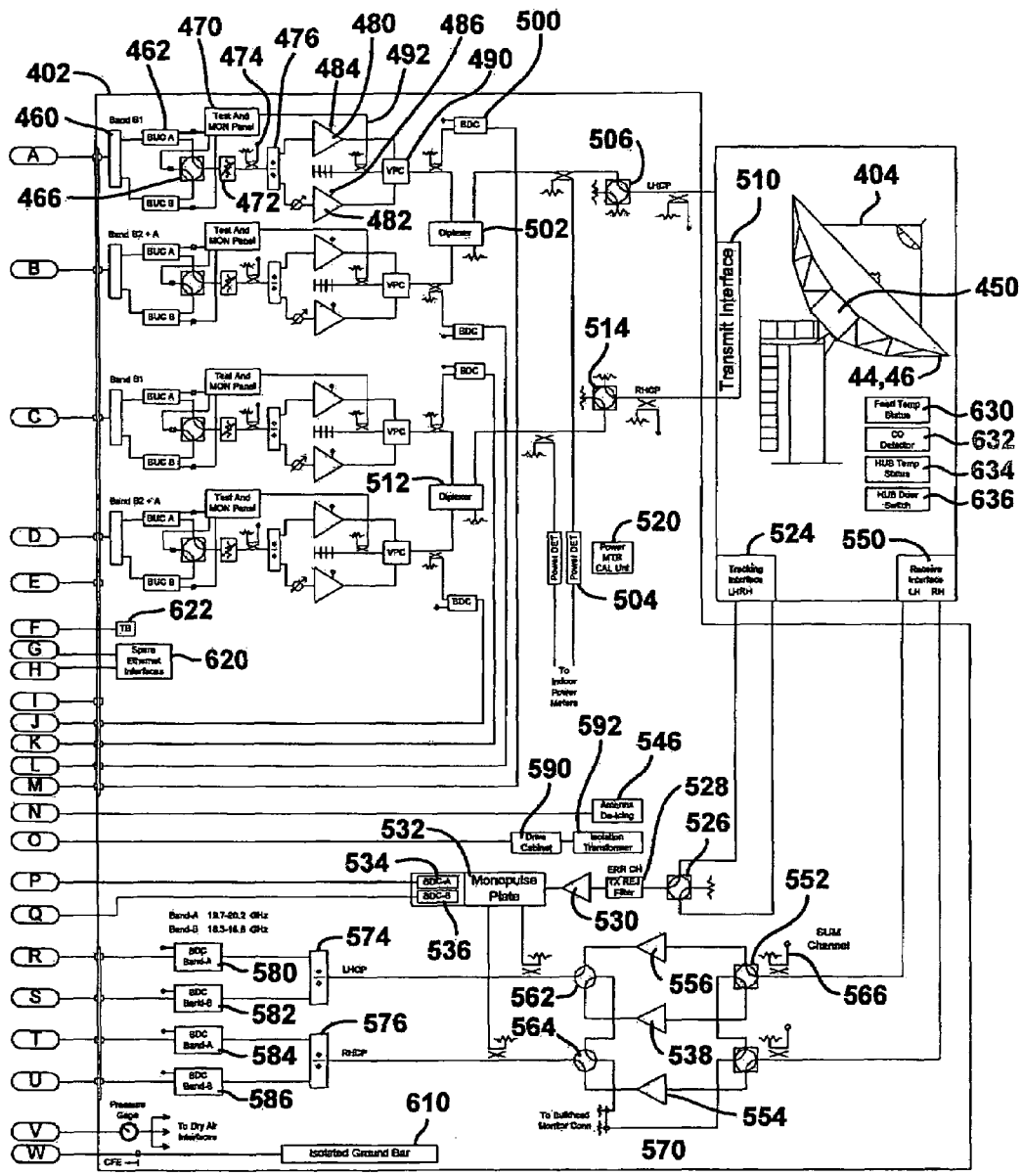

Referring now to FIGS. 5A and 5B, a schematic of a primary site 40 or diverse site 42 is illustrated. It should be also noted that the central site 14 may also be configured in a similar manner.

Each primary site 40 and diverse site 42 includes an indoor portion 400 and an outdoor portion 402. The outdoor portion includes a limited motion antenna assembly 404.

The indoor portion 400 may receive various channels of television signals. In the present embodiment, four groups of channels A-E, F-J, K-O and P-T are ultimately input to the switch 416. Channel inputs A through E may use 950-1,200 Megahertz. Each channel includes a first modulator 410 and a second modulator 412. The modulators 410 and 412 are redundant modulators which are controlled by the modulator switch 414. That is, the modulator switch 414 is coupled to redundant modulators 410 and 412 and chooses between one or the other switch. The modulator switch 414 may be controlled by the control configuration described above in FIG. 3. The modulators 410, 412 receive the digital baseband signals and converts them to a second frequency band such as the L-band. Also, the modulators 410, 412 are used to place the signals into the desired modulation scheme. As is shown, several groupings of channels may be provided. The outputs of each of the modulator switches 414 are provided to an L-band switch 416. The L-band switch 416 receives the various inputs from the modulator switches 414.

Secondary or additional inputs such as engineering inputs ENG1 and ENG2 may be used to modulate various signals or provide a set of secondary or back-up modulators or modulator switches if both modulators in one of the redundant channels above fail. Also, if one of the modulator switches 414 fails, both engineering chains ENG1 and ENG2 are available. The outputs of the additional inputs may be routed to various outputs as a back-up.

The L-band switch 416 may also provide a throughput for baseband monitoring. This is illustrated as output 12B within the L-band switch. Various engineering inputs may also be switched to various outputs through the controller as described above in FIG. 3. For example, should the first channel 1 input chain fail, engineering chain 1 may be switched to provide an output through the L-band switch. A plurality of jack fields 418 may also be provided. Jack fields 418 allow the ability to jack in or connect various inputs including another input or the rerouting of various inputs. It should also be noted that each pair of modulators for each channel may have a center frequency that is spaced apart by a pre-determined amount. In the present example, the modulators are spaced apart by a center frequency of 40 megahertz. The output of the L-band switches are grouped together at a summer 412. Another jack field 424 may be provided so that the signal may be manually monitored. A coupler 430 receives the summed signals from the summing block 420 and provides them to redundant line drivers 432, 434. A switch 436 selects one of the outputs of the line drivers 432, 434 to be provided to an output 438 of an indoor portion. The output of each of the switches may be routed to a monitor switch 440. The switch 440, as will be described later, provides signals to a spectrum analyzer 442. That is, in the process of broadcasting, various signals may be routed to the spectrum analyzer.

A communication line or plurality of communication lines 444 may be used to couple the indoor portion 400 and the outdoor portion 402. The L-band signals are transmitted through the communication lines 444.

The outdoor portion 402 may be included within a housing 450 of the antenna 404. The outdoor portion 402 includes a splitter 460 that splits the signals received from the indoor portion 400 through the communication line 444 and provides them to a first block upconverter 462 and a second block upconverter 464. Block upconverters 462, 464 have an output provided to a switch 466 which routes the output to a test and monitor panel 470 or to an output 472. Sample points 474 may be used to sample the output of the switches. Thus, it should be noted that one output of one of the block upconverters 462, 464 is provided to the variable attenuator. The attenuated signals from the variable attenuator are used for matching signal levels output from the block upconverter. A splitter 476 splits the signals and provides them to high power amplifiers 480, 482. Each high power amplifier may include a monitoring point and adjustment point 484, 486 as will be described below. The outputs of the high power amplifiers 480, 482 are provided to a variable phase combined amplifier 490. The variable phase combined amplifier 490 includes a first output 492 that is provided to a test and monitor panel 470. It is desirable for the output 492 of the variable phase combined amplifier 490 to be zero or nearly zero at the first output. The variable phase combined amplifier 492 combines the outputs of the high power amplifier 480, 482 to generate a high-power output. Should one of the high-power amplifiers 480, 482 fail, the output of the variable phase combined amplifier reduces to the output of the working high-power amplifier. This happens relatively quickly and thus the on-the-air signal does not become interrupted.

The test and monitor panel 470 is used to monitor the output of the variable phase combined amplifier 490. A laptop computer or the like may be carried to the antenna and coupled to the test and monitor panel. An Ethernet connection may also be provided to test and monitor panel. An adjustment may be made on one or both of the high-power amplifiers so that the phase is adjusted so that both the outputs of the high-power amplifiers 480, 482 are in phase.

The output of the variable phase-combined amplifier 490 may be provided to a block downconverter 500. The block downconverter 500 provides output back to the indoor portion 400 and eventually back to the spectrum analyzer 442 for monitoring. The first four circuits for various groups of channels are identical up to this portion.

The first two groups of outputs from the first two variable phase-combined amplifiers 490 are combined at a diplexer 502. The diplexer 502 provides the signal to the left-hand circularly polarized transmit interface 510 of the antenna 404. A sample may also be taken to detect the power output at power detector 504. A switch 506 may control the output to the transmit interface 510 from the diplexer 502. The second two groups of circuitry from the splitter 460 through the variable phase combined amplifiers 490 are identical. In addition, the diplexer 512 provides a right-hand circularly polarized output through a switch 514 to the second transmit interface 510.

A power motor calibration unit 520 may also be provided. The power detectors 504 may be provided to indoor power meters 628 described below.

A tracking interface 524 coupled to the antenna receives left-hand and right-hand circularly polarized signals that are provided to a switch 526. The switch 526 has an output that is passed through a transmit rejection filter 528 to reject the transmitted signal from the receive signal. An amplifier 530 amplifies the signal and a monopulse plate 532 receives the signal. A pair of block downconverters 534, 536 downconvert the divided signal to a lower frequency such as L-band. It should be noted that the signals received at the tracking interface are from a beacon. The outputs of the block downconverter 534, 536 are provided to a pair of beacon receivers 538, 540 through communication lines 444. The beacon receivers 538 and 540 are disposed within the indoor portion. The beacon receivers 538, 540 may each be coupled to an antenna control unit 542. It should be noted that the beacon receivers 538, 540 are serially connected to a controller or server of the system. Should one of the block downconverters or one of the beacon receivers fail, one serial input to the controller may be provided. The beacon receivers 538, 540 are also coupled to the antenna control unit 542. The antenna control unit 542 provides an alternate to the serial interface should the serial interface fail. The antenna control unit 542 may, for example, be coupled through an Ethernet-type connection. As will be mentioned below, the amount of power to be used in uplinking signals may be determined using the beacon receivers. As will be further described below, deicing control 544 may be provided in the indoor portion while the antenna deicing system 546 is provided at the antenna. Deicing may be provided using hot air techniques.

An antenna interface 550 is provided that receives left-hand and right-hand circularly polarized signals. The left-hand and right-hand circularly polarized signals are provided to switches 552 and 554, respectively. It should be noted that for redundancy three amplifiers 556, 558 and 560 are provided. Output switches 562 and 564 are also provided. Sampling points 566 and 568 may be provided prior to the switches 552 and 554. Also, the output of switches 562 and 564 may be coupled to a bulkhead monitor connection 570. The output of switches 562 is provided to a first splitter 574 and a second splitter 576. The split signal is provided to a first block downconverter 580, a second block downconverter 582, and the output of the second splitter 576 is provided to a third block downconverter 584 and a fourth block downconverter 586. The output of the block downconverters 580-586 is provided to a coupler which in turn may couple the signals to the switch and ultimately to the spectrum analyzer 542.

The antenna control unit 542 may be coupled to the drive cabinet 590 which in turn is coupled to an isolation transformer 592.

Various other equipment may also be included in the indoor portion such as dehydrators 600, 602 that are provided to a manifold and monitor 604. A pressure gauge output 606 is provided to the dry air interfaces. An isolated ground bar 610 may be provided within the outdoor portion. The indoor portion may also include a block upconverter in variable power combined amplifier control 612.

A monitor and control rack 616 may be used to house the various equipment. The rack may be shared for multiple systems. The rack 616 may include serial, discrete and Ethernet interfaces for use in multiple systems.

A pair of GPS receivers 618, 620 with redundant antennas 52A, 52B may also be provided. The GPS receivers 618, 620 provide outputs to switches 622. The GPS receivers 618, 620 may be used to provide a precise time monitor so that precise timing may be provided for the primary site and a reference for switching which will be later described below for the diversity site as provided.

Power meters 628 may also be provided to monitor the pre-transmit power of the system from power detectors 504. Spare Ethernet connections 620 and spare cable 622 may also be provided.

The antenna may also include various centers such as a feed temperature status sensor 630, carbon monoxide sensor 632, a hub temperature status 634 and a hub door switch 636. Each of these parameters may be provided to the servers for display on a graphic user interface.

Various test points along the circuiting are used to provide the system operators with an assessment of the signals. If one component is not working, a back-up component may be used. Also, the signals may be monitored at various locations so that the precise location of the failing or failed component may be determined.

Figure 6:
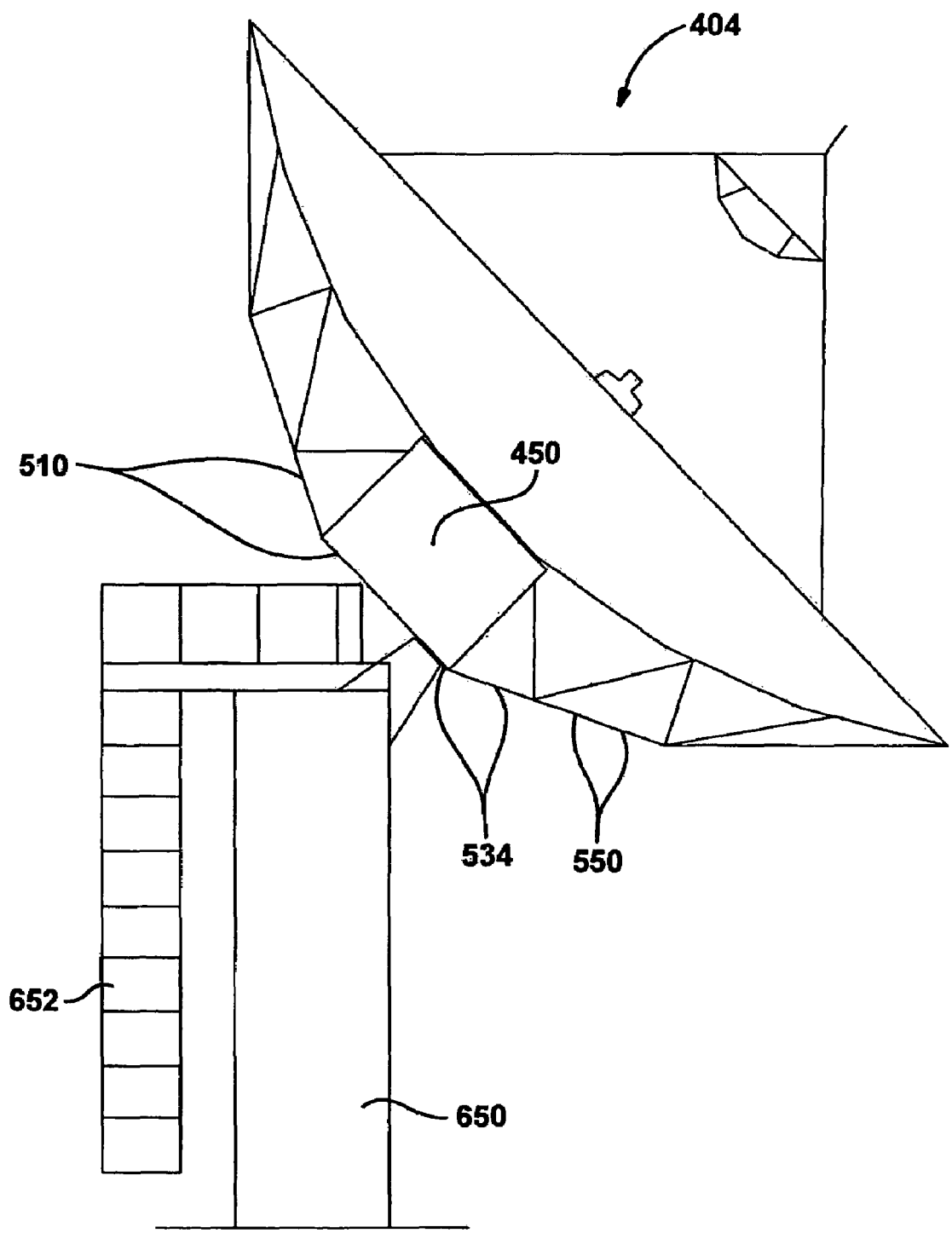
FIG. 6 is a cutaway view of an antenna according to the present disclosure.

Referring now to FIG. 6, an enlarged view of the limited motion antenna 404 is illustrated. Antenna 404 includes housing 450 that houses much of the circuitry in the outdoor portion of FIG. 5. The antenna may be mounted on a concrete stand 650 that includes a stairway 652 so that the housing 450 may be reached. Transmit interface 510, tracking interface 524 and receive interface 550 are shown.

Figure 7:
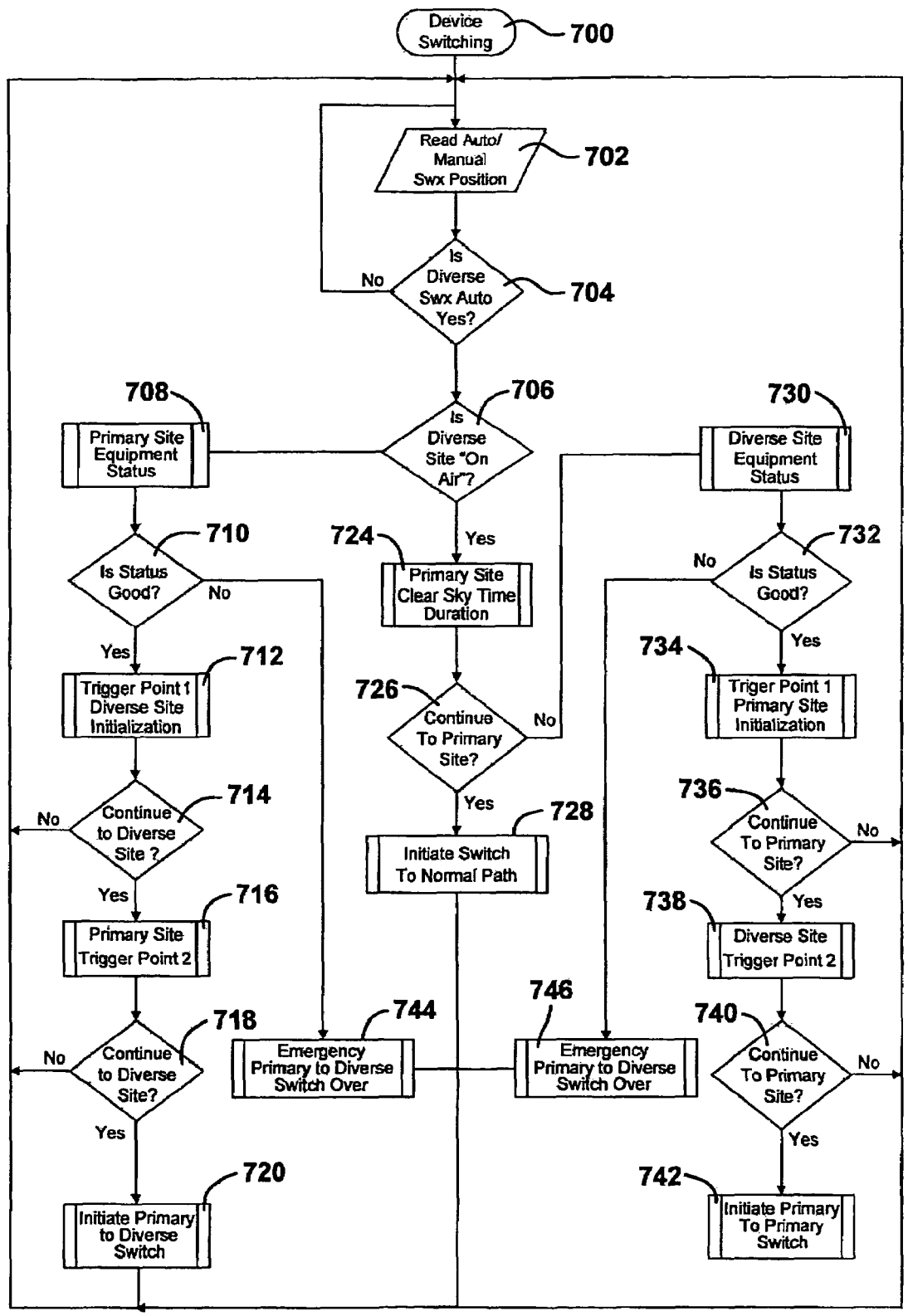
FIG. 7 is a flowchart illustrating switching logic for a primary and diverse site.

Referring now to FIG. 7, a high level flowchart executed by the controllers or servers within the system illustrates the flow of switching between the primary site and the diverse sites. Several of the steps illustrated by a double rectangle method are described in detail in other figures. In step 700, the diverse switching method is started. In step 702, a manual or automatic switch position is determined. In step 704, the diverse switch is not in an automatic setting. Step 702 is again executed. In step 704, the diverse switch is in automatic. Step 706 determines if the diverse site is not on the air. If the diverse site is not on the air, the equipment status of the diverse site is checked. This will be described below in a further flowchart. If the status returned in step 708 is good in step 710, the system continues to step 712 which determines if a trigger point from the diverse site is reached. Trigger point 1 initiates initialization of the diverse site which will be described below. In step 714, if the method determines that continuation to the diverse site is warranted, step 716 is performed. In step 716, if the primary site trigger point 2 has been reached, step 718 is performed. In step 718, if the trigger point 2 has been reached, step 720 is performed which initiates the primary to diverse switch site. This will be further described below. After step 714 and 718, if the answer to either of the questions is no, step 702 is again executed. Also, after step 720 and the primary site has been switched to the diverse site, step 702 is again executed.

Referring back to step 706, if the diverse site is on the air, step 724 is performed in which the primary site clear sky time duration is determined. After the sky has been cleared for a certain amount of time, the system may again switch to the primary site. After step 724, step 726 determines whether or not to continue to the primary site based upon the clear sky time duration. If a continuation to the primary site is performed, a switch to the normal path is performed in step 728. After step 728, 702 is executed.

If a continuation to the primary site is not warranted in step 726, step 730 is performed in which a diverse site equipment status is performed. This will be described below. In step 732, if the status if good, step 734 is performed in which the primary site is initialized if trigger point 1 is reached. In step 736, if continuation to the primary site is warranted, step 738 determines whether the diverse site trigger point 2 has been reached. This will be described further below. In step 740, if a continuation to the primary site is determined by checking the diverse site trigger point, step 42 initiates a switch from the diverse site to the primary site. After step 742, step 702 is again performed.

Referring back to step 710 and step 732, if the status of the primary site in step 710 or the status of the diverse site is not good in step 732, steps 744 and 746 are respectively performed. Steps 744 and 746 will be further described below. After steps 744 and 746, step 702 is again performed.

It should be noted that the various trigger points and the steps to the process may be displayed on a graphical user interface shown in FIG. 3.

Referring now to FIGS. 8A and 8B, the process for checking the equipment status of the primary site in step 708 of FIG. 7 and checking the equipment status of the diverse site in step 730 of FIG. 7 are nearly identical. Therefore, each of the identical steps is labeled in FIG. 8B with a prime. The steps are identical except for the reference to either the primary site or the diverse site depending on the original step. Therefore, FIG. 8A will be discussed and the changes to FIG. 8B will be highlighted.

In step 800, the primary site equipment status is displayed as red or other indicator on the Graphical User Interface. If there is no communication fault at the primary site, step 804 is performed in which one or both of the traveling wave tubes are determined if they are ready. If the traveling wave tubes are ready, step 806 is performed in which it is determined if the primary site uplink power control is active. If the uplink power control is active, the system returns back to step 710 of FIG. 7 in step 808. If a communication fault is present at the primary site or one or both of the traveling wave tubes is not ready in step 806 or the primary site does not have the uplink power control ready, step 810 generates a message of the primary site failure and sets the diverse switch to manual in step 812. Step 818 sets the primary site display to red or other indicator and returns a NO status in step 816 so that step 744 of FIG. 7 is performed.

Referring now to FIG. 8B, each of the same process steps of FIG. 8A is performed except with reference to the diverse site. If the diverse site is ready in step 808 prime, the status is good and the system continues to step 734 of FIG. 7. If the diverse site is not ready, the system returns to step 732 in which the status would not be good and thus step 746 is performed thereafter. In step 814 prime, the diverse site graphical user interface is displayed to red.

Referring now to FIGS. 9A and 9B, steps 744 and 746 of FIG. 7 are illustrated in further detail. In step 840, the diverse radiate/terminate switch position is determined. In step 842, if the switch is not in radiate position, step 844 is performed in which a command to change the diverse radiate/terminate switch position to radiate is performed. If the switch is not in the radiate position in step 846, step 848 generates a message that the primary to diverse switch failure is performed. In step 850, the primary site graphical user interface may be changed to a different color such as red to indicate a failure. The system returns in step 852. Referring back to steps 842 and 846, if the switch is placed in radiate, step 854 un-mutes the diverse block upconverter or removes the traveling wave tube inhibit signal. In step 856, a primary site timer delay (P2D) is performed. If the delay is achieved in step 858, the system continues to step 860. If the delay is not achieved, step 856 is continually performed until the delay has been achieved. In step 860, the primary block upconverter is muted or the traveling wave tube is set to inhibit. In step 862, the diverse site graphical user interface is changed to an indicator such as green to indicate the diverse site is operating.

Referring now to FIG. 9B, similar steps to those shown in 9A are illustrated except that the diverse to primary switchover is performed. The process in FIG. 9B returns in step 842 prime to step 746 of FIG. 7.

Referring now to FIGS. 10A and 10B, step 712 and 734 of FIG. 7 are performed. Again, these figures are complimentary. In step 712 of FIG. 7, the steps necessary to prepare the diverse site during a first fade event is determined. In step 880, the primary site fade level is determined. The primary site fade level may be determined using received beacons as will be further described below. In step 880, the primary site variable phase combined amplifier status is determined. If the variable phase combined amplifiers are not combining the traveling wave tubes (HPAs 480, 482 of FIG. 5) in step 844, step 886 is performed in which it is determined whether the fade of the primary site minus three decibels, the answer is no, the system returns to step 890. In step 884, if the variable phase combined amplifiers are combining the traveling wave tubes outputs, step 888 is performed. If the fade is not greater than a threshold such as TP1, step 890 is again performed and the system is returned. In steps 886 and 888, if the system is greater than test point 1 minus 3 decibels or is greater than test point 1 in step 888, step 892 the primary switch from radiate determining is performed as will be further described below in FIG. 11.

After step 892, the system returns to step 894 with a YES status to step 714.

Referring now to FIG. 10B, the identical steps are performed except with respect to primary site initialization. Steps 886 prime and 881 prime use a fade threshold TD1 of the diverse site for its variable. The variable TD1 and TP1 may be equivalent.

Figure 11A:
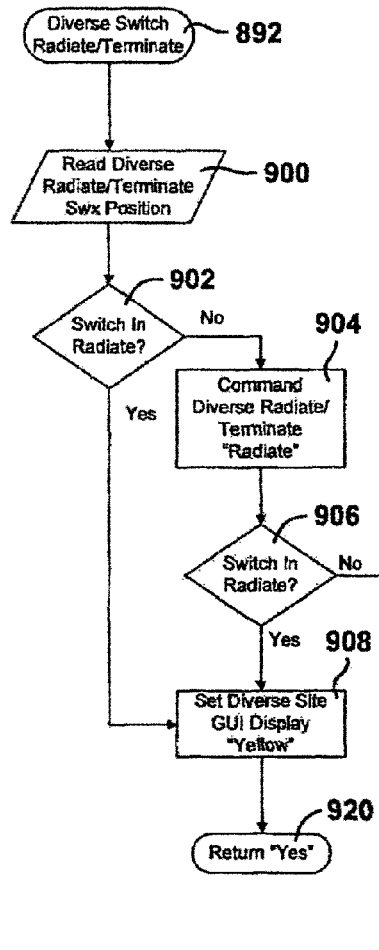
FIGS. 11A and 11B are flowcharts illustrating a radiate/terminate function for a diverse switch and a primary switch, respectively.
Figure 11B:
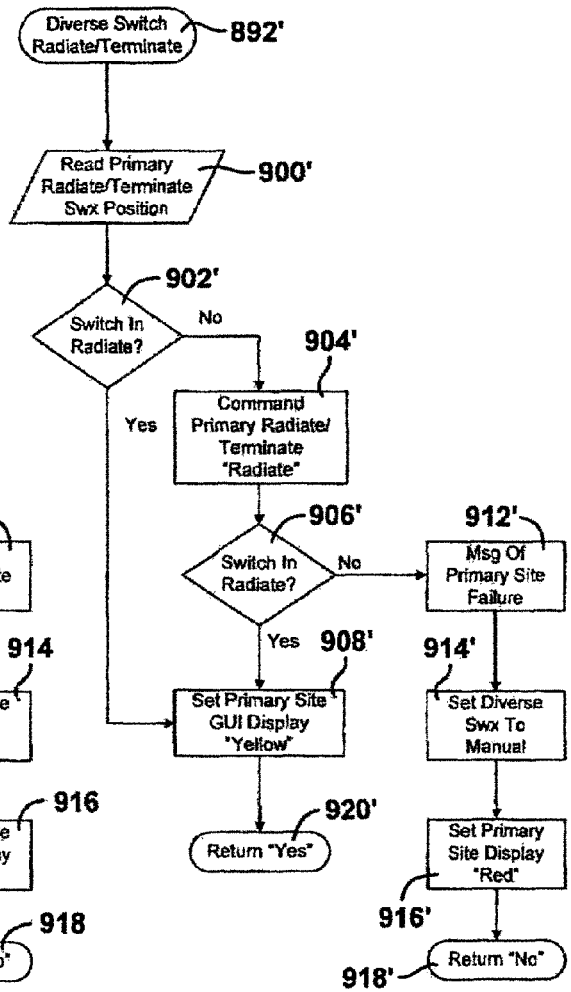

Referring now to FIGS. 11A and 11B, steps 892 and 892 prime of FIGS. 10A and 10B are illustrated in further detail. Yellow may be used as a display for a "hot standby" where the radiate/terminate switch (controlling its block upconverter for example) is in the radiate position with the signal still muted at the diverse site. Red may be used as a failure. In step 900, the diverse radiate switch position is read. In step 902, if the switch is not in radiate position, a command is generated to change the switch to the radiate position in step 904. After step 904, step 906 is performed. Steps 902 and 906 determine if the switch is in radiate position. In steps 902 and 906 if the switch is in radiate position, step 908 is performed in which the diverse site graphical user interface is displayed differently such as in "yellow." In step 910 the system returns a YES status back to step 712 in step 894.

Referring back to step 906, if the switch is not in radiate position in step 906, step 912 generates a message of diverse site failure and step 914 sets the diverse switch to manual. Step 916 generates a graphical user interface color such as red to indicate a problem with the diverse site. In step 918, the system returns a NO to step 894.

Referring now to FIG. 11B, the identical process is used for determining whether the primary switch is in radiate or terminate. Therefore, these commands will not be further described below.

It should be noted that the above first fade function is where a "hot" standby mode is entered. If in the loop the system returns back to a clear sky, the system will return back to the primary function. If conditions worsen, a second threshold level converts the system into transmitting to the other site. That is, if the primary site is transmitting, a diverse site is used. If the diverse site is transmitting, the primary site is used.

Figure 12A:
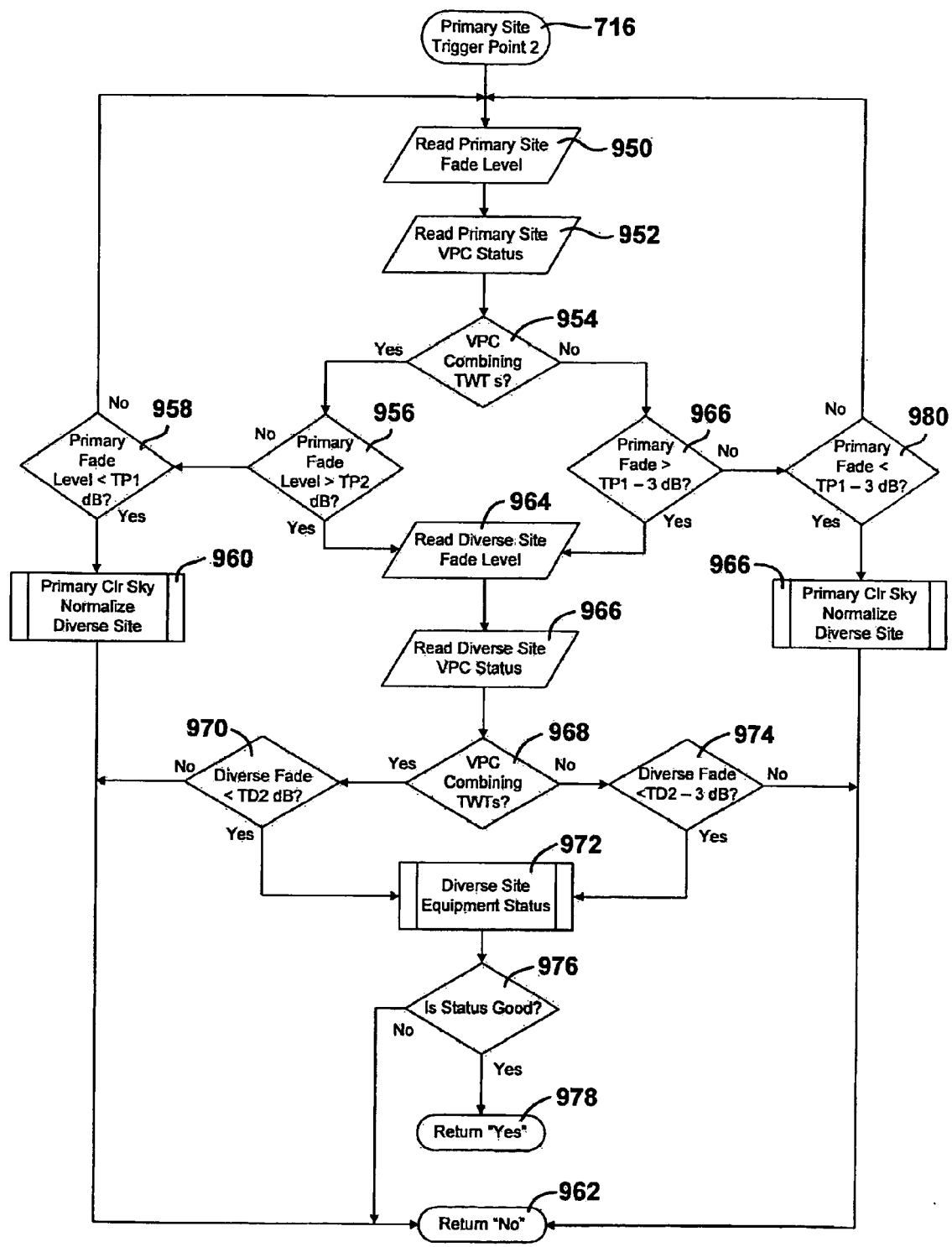
FIGS. 12A and 12B are flowcharts of a primary site second trigger point and a diverse site trigger point, respectively.

Referring now to FIG. 12A, step 716 of FIG. 7 is illustrated in further detail. In step 950, the primary site fade level is determined. As mentioned above, the fade level may be determined based upon the received beacon signals. In step 952, the primary sites variable phase combined amplifiers status is determined. If the variable phase combined amplifiers are combining the traveling wave tubes (HPA) outputs in step 954, step 956 is performed. In step 956, if the primary fade level is not greater than a second threshold (TP2), step 958 is performed. If the primary fade level is less than the first threshold (TP1), step 950 is again executed. After step 958, if the primary fade level is less than test point 1 (TP1), step 960 is performed. Step 950 will be further described below. After step 960, the system returns a NO back to step 716 in step 962.

Referring back to step 956, if the primary fade level is greater than the second threshold TP2, step 964 is performed. Referring back to step 954, if the variable phase combined amplifiers are not combining the traveling wave tube outputs, step 966 is performed. If the primary fade is greater than a second threshold minus three decibels or some other value, step 964 is performed. In step 966, the diverse site variable phase combined amplifier status is determined. In step 968, if the variable phase combined amplifiers are combining the traveling wave tube outputs, step 970 is performed in which a diverse fade it is determined whether the diverse fade is less than the diverse test second (TD2) threshold. If the diverse fade is not less than the diverse second threshold (TD2), step 962 returns a NO status. Referring back to step 970, if a diverse fade is less than the second diverse threshold, step 972 is performed.

Referring back to step 968, if the variable phase combined amplifier is not combining the traveling wave tube (high power amplifier outputs), step 974 is performed in which it is determined whether the diverse fade is less than the second diverse threshold minus three decibels. If the diverse fade is not less than the diverse threshold minus three decibels, step 962 is again performed. In step 974, if the diverse fade is less than the second diverse threshold minus three decibels, step 972 is performed. Step 972 performs a diverse site equipment status that was described above in steps 708 and 730 and in FIGS. 8A and 8B.

If the status is good in step 976, a return of YES is performed in step 978. If the status is not good in step 976, step 962 returns a NO status in 716.

Referring back to step 966, if the primary fade is not greater than the second primary threshold minus three decibels, step 980 is performed. In step 980, if the primary fade is not less than the first primary threshold minus three decibels, step 950 is performed. This performs no switchover. In step 980, if the primary fade is less than the first primary threshold minus three decibels, step 982 is performed in which a primary clear sky normalized diverse site function is performed. This step will be further described below. After step 982, step 962 returns a NO condition.

Figure 12B:
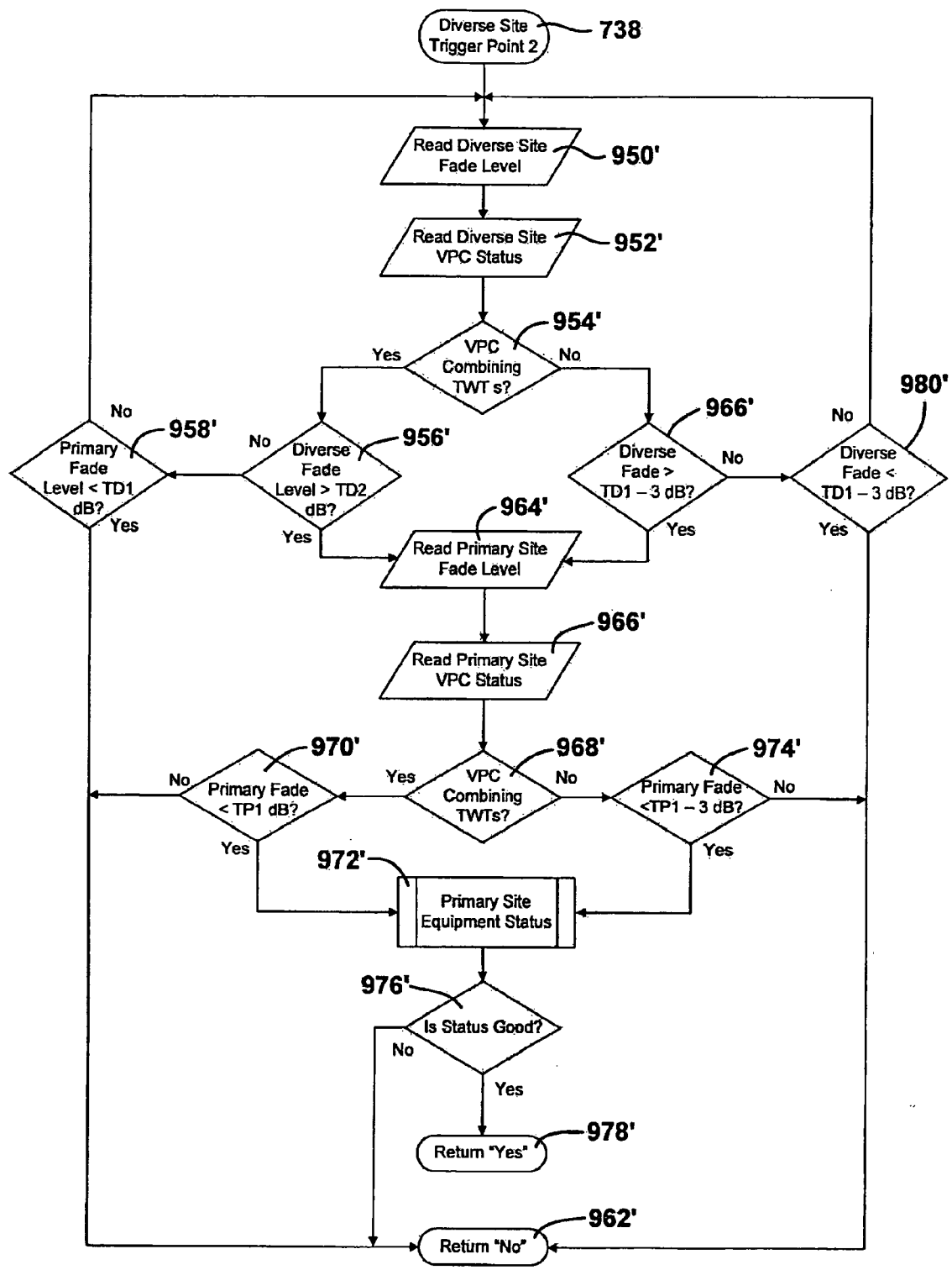

Referring now to FIG. 12B, the identical process with respect to the diverse site trigger point 2 (TP2) is performed. Thus, the entire process is exactly the same except that the thresholds have been changed from the primary thresholds to the diverse thresholds in steps 958', 966' and 960'. The thresholds have been changed in steps 970' and 974' from the diverse thresholds to the primary thresholds in steps 970' and 974'. Also, steps 960 and 982 do not have a corollary in FIG. 12B.

Figure 13:
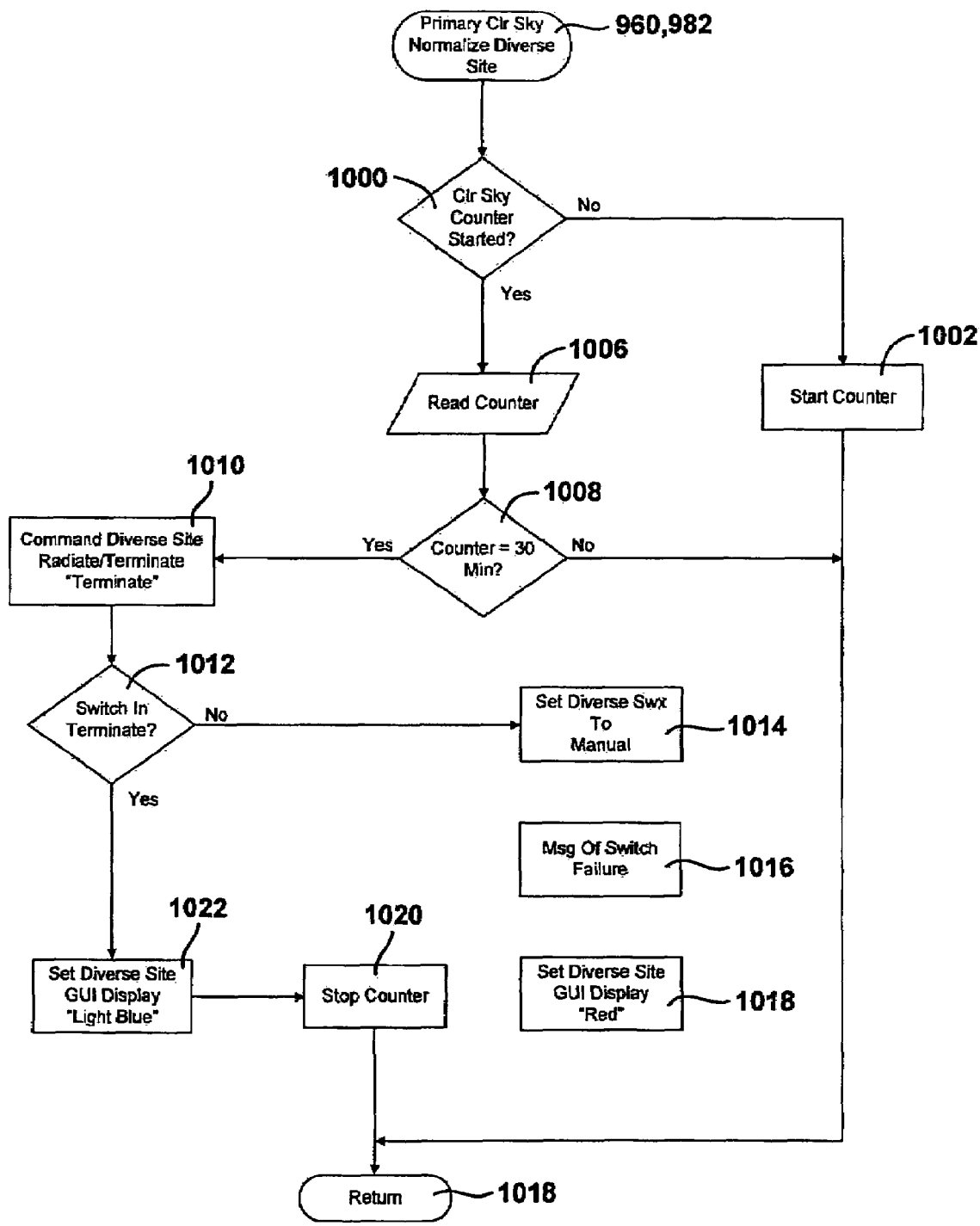
FIG. 13 is a flowchart of a primary clear sky normalized diverse site method of FIG. 12A.

Referring now to FIG. 13A, steps 960 and 982 are identical steps from FIG. 12 that normalize the radiate/terminate switch at the diverse site after a set amount of time of a primary site clear sky condition. It is desirable to broadcast using the primary site when conditions are suitable. In step 1000, if a clear sky counter has not been started, step 1002 starts a clear sky counter. The system then returns to step 1004.

Referring back to step 1000, if the clear sky counter has been started, step 1006 reads the clear sky counter. In step 1008, if the counter is not equal to 30 minutes, the system returns to step 1004. If the counter is equal to 30 minutes in step 1008, step 1010 commands the diverse site radiate/terminate switch to terminate. In step 1012, if the terminate switch is not in terminate, the diverse switch is set to manual. In step 1014, a message of switch failure is generated in step 1016 and diverse site graphical user interface may be displayed in a red color to indicate a failure. In step 1020, a counter is stopped.

Referring back to step 1012, if the switch is in a terminate condition, the diverse site graphical user interface (GUI) is displayed in a light blue or other color indicator in step 1022. In step 1020, the counter is stopped to indicate the system has now been changed over to the primary site.

Referring now to FIGS. 14A and 14B, steps 720 and 742 of FIG. 7 are illustrated in further details. In step 1040, the block upconverter may be used to initiate or discontinue transmission. Also, the traveling wave tube inhibit function may also be used to inhibit or enable transmission. In step 1040, the diverse block upconverter is un-muted. In step 1042, the diverse timer (P2D) delay is read. If the delay has not been achieved in step 1044, step 1042 is again performed. If the delay has been achieved in step 1044, step 1046 mutes the primary block upconverter or sets the traveling wave tube to inhibit. In step 1048, the diverse site graphical user interface may be changed to a different color such as green to indicate it is transmitting. In step 1050, the primary site graphical user interface is set to a yellow or different color to indicate a stand-by mode. In step 1052, the system returns to step 720.

Referring now to FIG. 14B, steps 1040 prime through 1052 prime are identical except with respect to the primary site rather than the diverse site. Therefore, these steps will not be further described below.

Figure 15:
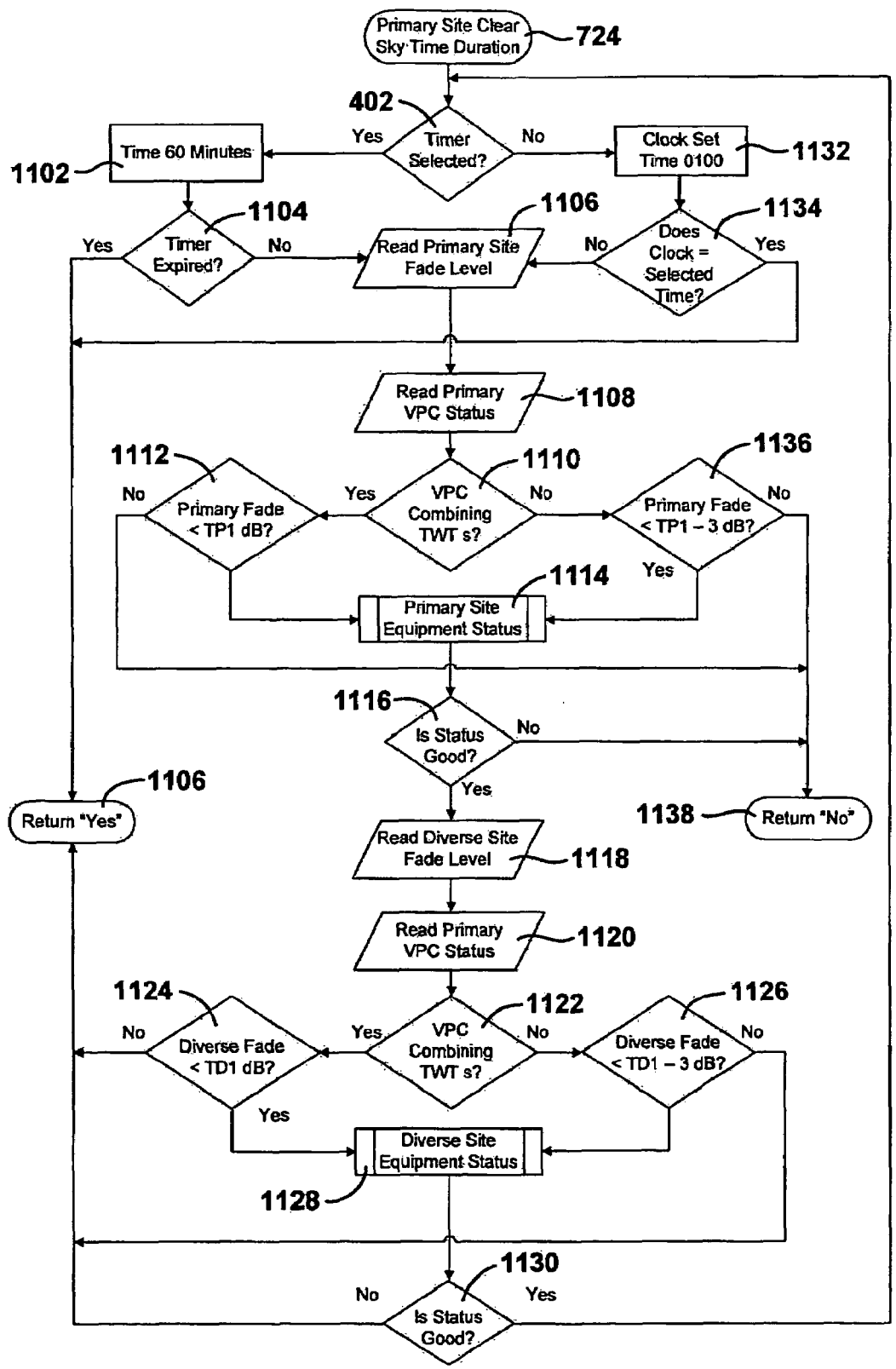
FIG. 15 is a flowchart of a primary site clear sky time duration function.

Referring now to FIG. 15, step 724 of FIG. 7 is described in further detail. Once the primary site enters into a clear sky condition, this function will time the switch over to the primary path either by a timer or manually entered set time clock. If a rain fade or equipment failure occurs during this routine, the function is not performed.

In step 1100, if the timer is selected, step 1102 sets the timer to a value such as 60 minutes. In step 1104, if the time has expired, step 1106 returns a YES function, yes to step 724. In step 1104, if the time has not expired, the primary site fade level is determined in step 1106. In step 1106, the primary site fade level is determined. After step 1106, step 1108 reads the primary variable phase combined amplifier status. In step 1110, if the variable phase combined amplifier is combining the traveling wave tube outputs, step 1112 determines whether the primary fade is less than the first primary threshold. If the primary fade is less than the first primary threshold (TP1), step 1114 is performed. Step 1114 performs a primary site equipment status. In step 1114, if the status is good in step 1116, the diverse site fade level is determined in step 1118. In step 1120, the primary variable phase combined amplifier status is determined.

In step 1122, if the variable phase combined amplifiers are combining with the traveling wave tubes in step 1112, step 1124 is performed in which the fade level is compared to the diverse site threshold. If the diverse site fade is less than the first diverse site threshold (TD1), the system returns to step 1106. In step 1122, if the variable phase combined amplifier is not combining with the traveling wave tube, step 1126 is performed in which it is determined whether the diverse fade is less than the first diverse threshold minus three decibels. If it is in step 1126, step 1128 is performed in which the diverse site equipment status is determined. A diverse site equipment status is also determined if the diverse fade is less than the first diverse threshold in step 1124. In step 1126, if the answer is NO, step 1106 is performed.

Referring back to step 1128, if the diverse site equipment status is performed, step 1130 is performed in which it is determined whether the status is good. If the status is not good, the system returns a YES in steps 1106. If the status is good, step 1100 is again performed.

Referring back to step 1100, if the timer is not selected, step 1132 is performed. In step 1132, the clock is set to a default time such as time 0100 and step 1134 is determined. In step 1134, if the clock does equal the selected time, step 1106 returns a YES.

Referring back to step 1110, if the variable phase combined amplifiers are not combining with the traveling wave tube, step 1136 is performed in which the primary fade is compared to the first primary threshold (TP1) minus three decibels. If the primary fade is less than the first threshold minus three decibels, step 1114 is performed. In step 1136, if the primary fade is less than the first primary threshold minus three decibels, step 1138 returns a NO in step 724.

Figure 16:
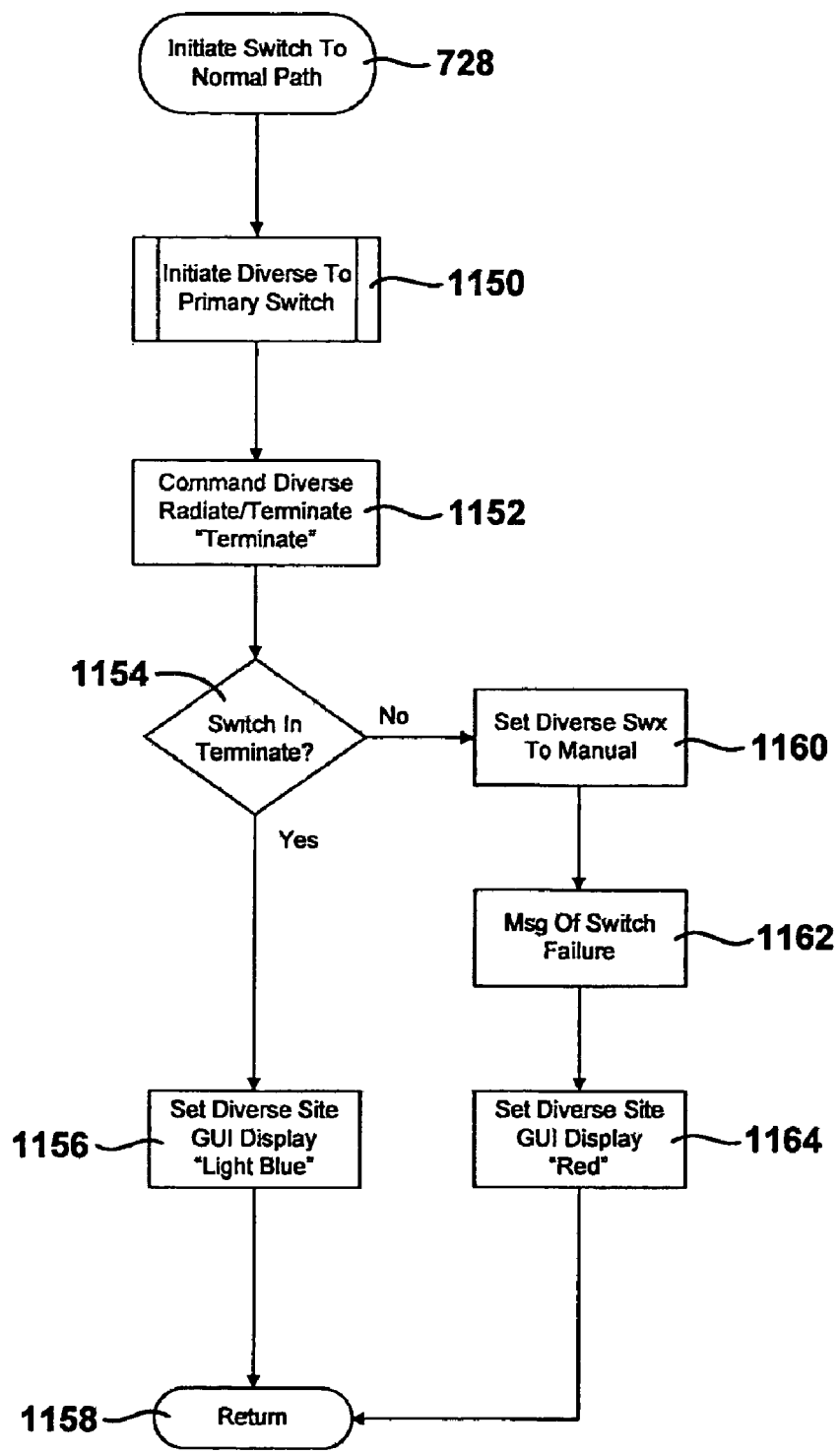
FIG. 16 is a flowchart of a switch to normal path function.

Referring now to FIG. 16, an initiate switch to normal path function is performed that corresponds to step 728 of FIG. 7. This function places the primary site back on the air. After the switch occurs, a primary site is placed into on-the-air and the graphic user interface may be placed to green.

The diverse site may be placed into a warm standby mode in which the status may be changed to a light blue and the radiate/terminate switch placed into terminate at the diverse site. In step 1150, the diverse to primary switching is performed. This corresponds to step 742 and was described in FIG. 14B above. In step 1152, the diverse radiate/terminate switch is commanded to terminate. In step 1154, if the switch is in terminate, step 1156 sets the diverse site graphical user interface to light blue or provides another indicator. The system returns in step 1158. In step 1154, if the switch is not in terminate, step 1160 sets the diverse switch to manual. In step 1162, a message of switch failure is generated. In step 1164, the diverse site graphical user interface is changed to display a red or other indication of a site failure.

Figure 17:
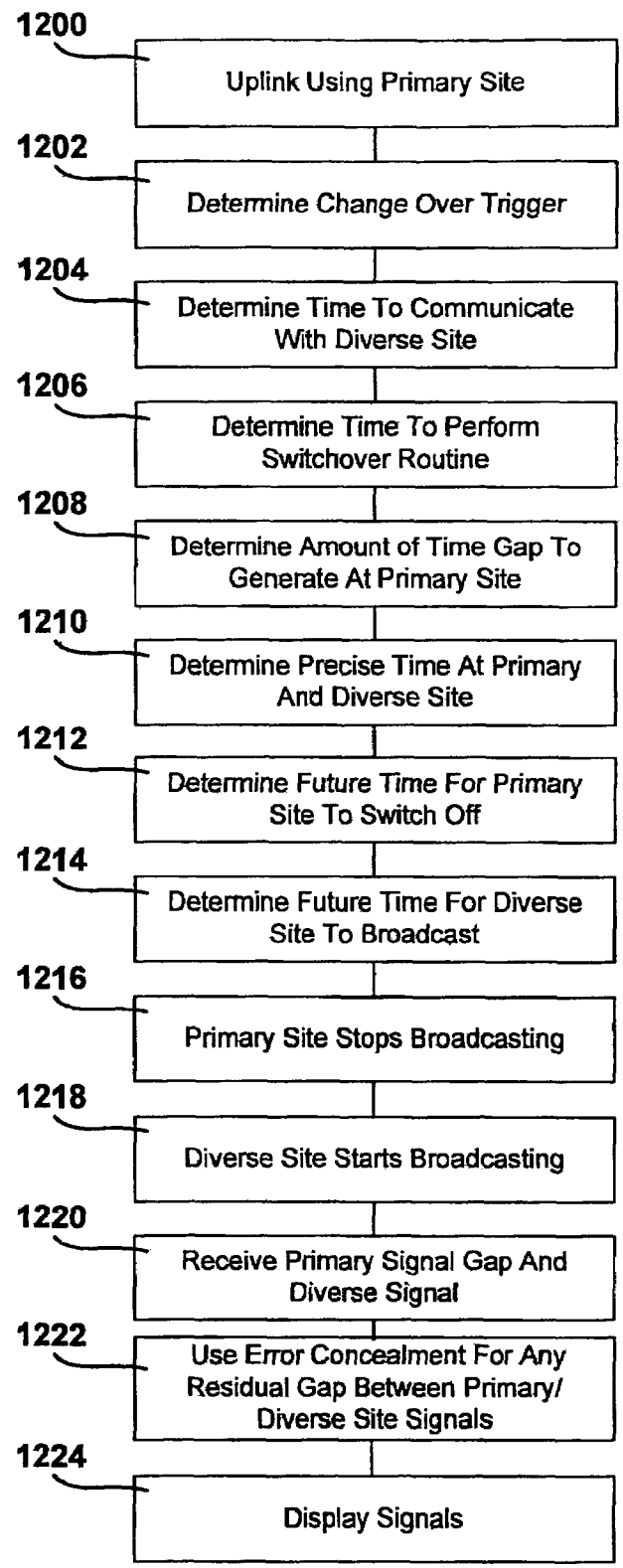
FIG. 17 illustrates a summary of a switchover between a primary site and a secondary site.

Referring now to FIG. 17, a summary of the method of changing between a primary site and a diverse site is set forth. Generally, the following method is used to project into the future a switching time taking into consideration various factors. A future switching time is determined both for the primary site and the diverse site so that a user has a slight gap between receiving the signals from the primary site and signals received from the diverse site.

In step 1200, uplinking is performed using the primary site. In step 1202, a changeover trigger is determined. The changeover trigger is described above as an increase in rain fade, an emergency condition, a maintenance condition or the like.

In step 1204, a time to communicate with a diverse site is determined. The time to communicate with a diverse site includes many factors including the type of connection, the exclusivity of the connection, the speed at which the information travels, and the distance between the primary site and the diverse site. The distance may be a significant factor since a diverse site may be separated by a primary site by tens of miles such as 50 miles. As mentioned above, the signals may be communicated in a video over internet protocol format. This time may be measured experimentally. It may be determined at various times throughout the day or determined right before a changeover is required.

In step 1206, the time to perform the switchover routine is also determined. This is the time that it takes to process the changeover and may thus be referred to as a switchover processing time. As was mentioned above, the block upconverters may be used to control the switchover. The block upconverter may be controlled by the controller which takes a finite amount of time to command and to switch-on or power-up and switch-off or power-down the device.

In step 1208, an amount of time gap to generate at a receiving device is determined. The gap may be calculated at the primary site. The time gap is determined so that at the receiving device signals uplinked from the primary site are received followed by an empty space, or gap, where thereafter the signals uplinked from the diversity site begin. This may be also experimentally determined. The time gap may vary but should be small enough to be compensated in an error control module as described below.

In step 1210, a precise time at the primary and diverse site is determined using various methods that may include receiving a global positioning signal having the time therein.

In step 1212, the future time for switching the primary site to OFF is determined. That is, the time for switching the primary site to OFF is projected slightly into the future. The future time for switching the primary site to OFF may take into consideration the various parameters set forth above in steps 1206, 1208 and 1210. Namely, the time for determining the site to switch up may take into consideration the times determined in steps 1204 through 1208. Also, in step 1214, the future time for the diversity site to switch-ON or broadcast is also determined. Both of the times are based upon the parameters such as the time to communicate with the diverse site, the time to perform the switchover routine and the time to generate a gap between the devices. In step 1216, the primary site stops broadcasting based upon the future time set forth above and the diverse site begins broadcasting in step 1218.

In step 1220, the primary signals, gap and diverse site signals are received in that order at the receiving device. In step 1222, error concealment is performed at the receive device before the signals are displayed on the television in step 1224. Any residual time gap in the received signals is removed.

Figure 18:
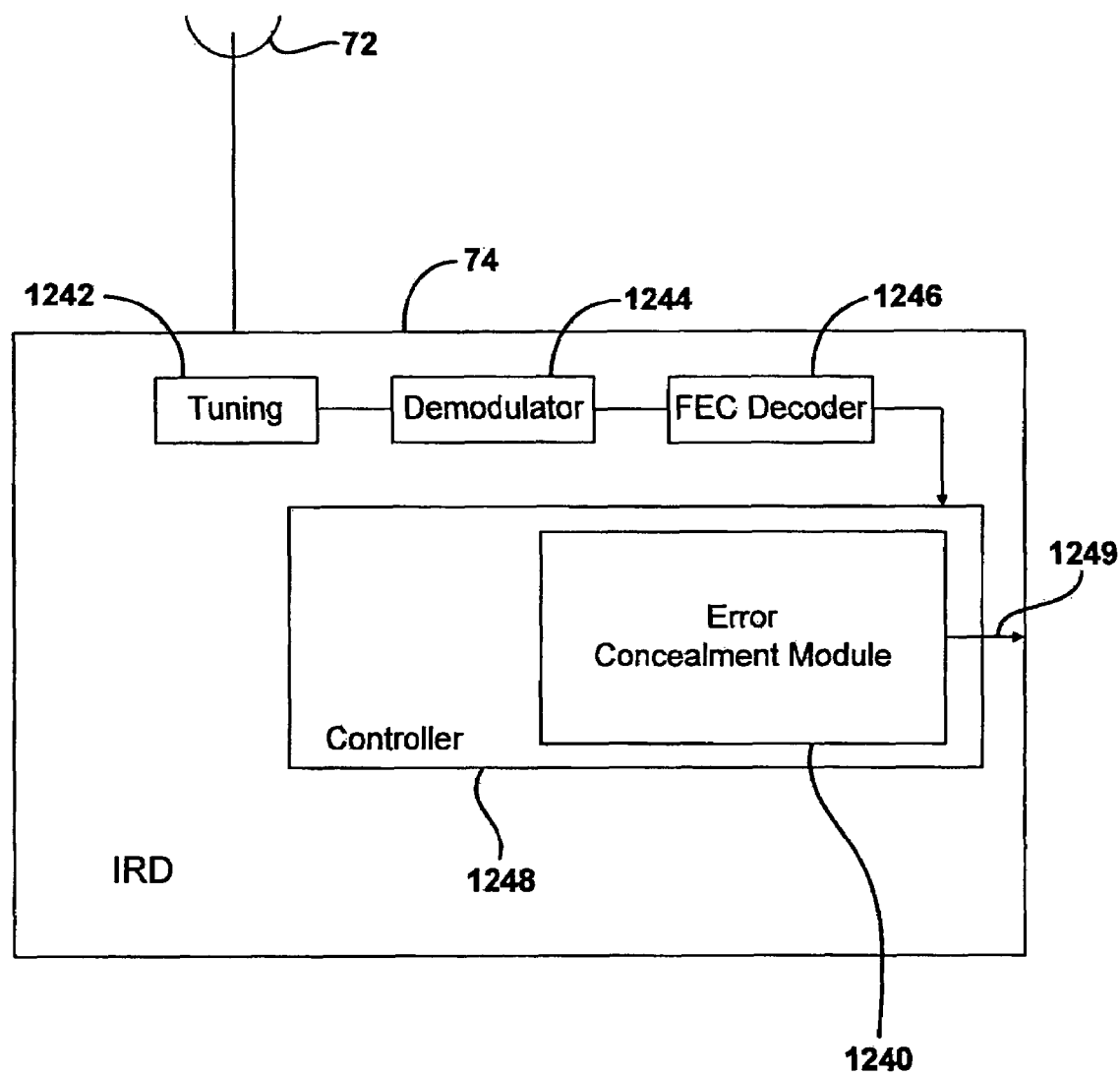
FIG. 18 is a high level view of an integrated receiver decoder having an error conceal module.

Referring now to FIG. 18, the IRD 74 and antenna 72 illustrated in FIG. 1 is set forth in further detail. The IRD 74 may include an error concealment module 1240 among its other known functions such as tuning in tuner 1242, demodulating in demodulator 1244 and decoding in a forward error correction decoder 1246. Controller 1248 may contain the error concealment module 1240. The error concealment module 1240 performs many functions including removing slight gaps or discontinuities in the signal so that they are not readily observable by the viewer in an output signal 1249.

Figure 19A:
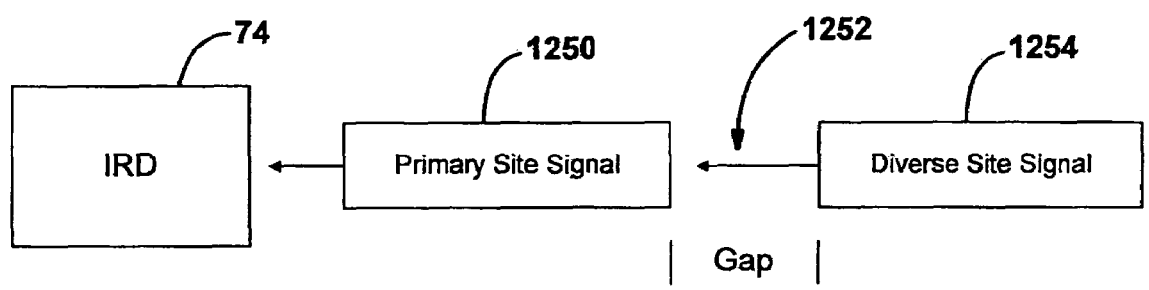
FIGS. 19A and 19B are timing charts illustrating the primary site signal, secondary site signal and a gap.

Referring now to FIG. 19A, an integrated receiver decoder (IRD) 74 is illustrated receiving a primary site signal 1250, followed by a time gap 1252, followed by the diverse site signal 1254 in accordance with the method set forth in FIG. 17.

Figure 19B:
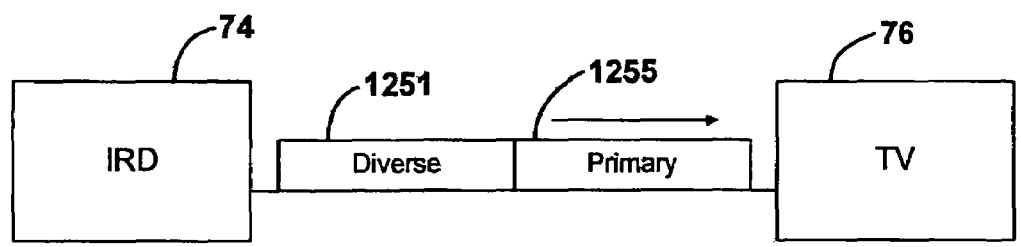

Referring now to FIG. 19B, IRD 74 is shown transmitting primary site signal 1255 and diverse site signal 1251. The IRD 74 may modify the signals to remove any gap between them so that the television 76 has no observable gap therebetween. It should be noted that various techniques for error concealment, such as digitally manipulating the signals and the user of buffers, is known in current generation DirecTV integrated receiver decoders. This error concealment can be used to allow a gap between the signals. By providing a gap, an overlap in the signals is avoided. An overlap in the signals may cause errors in the integrated receiving device 74.

Figure 20:
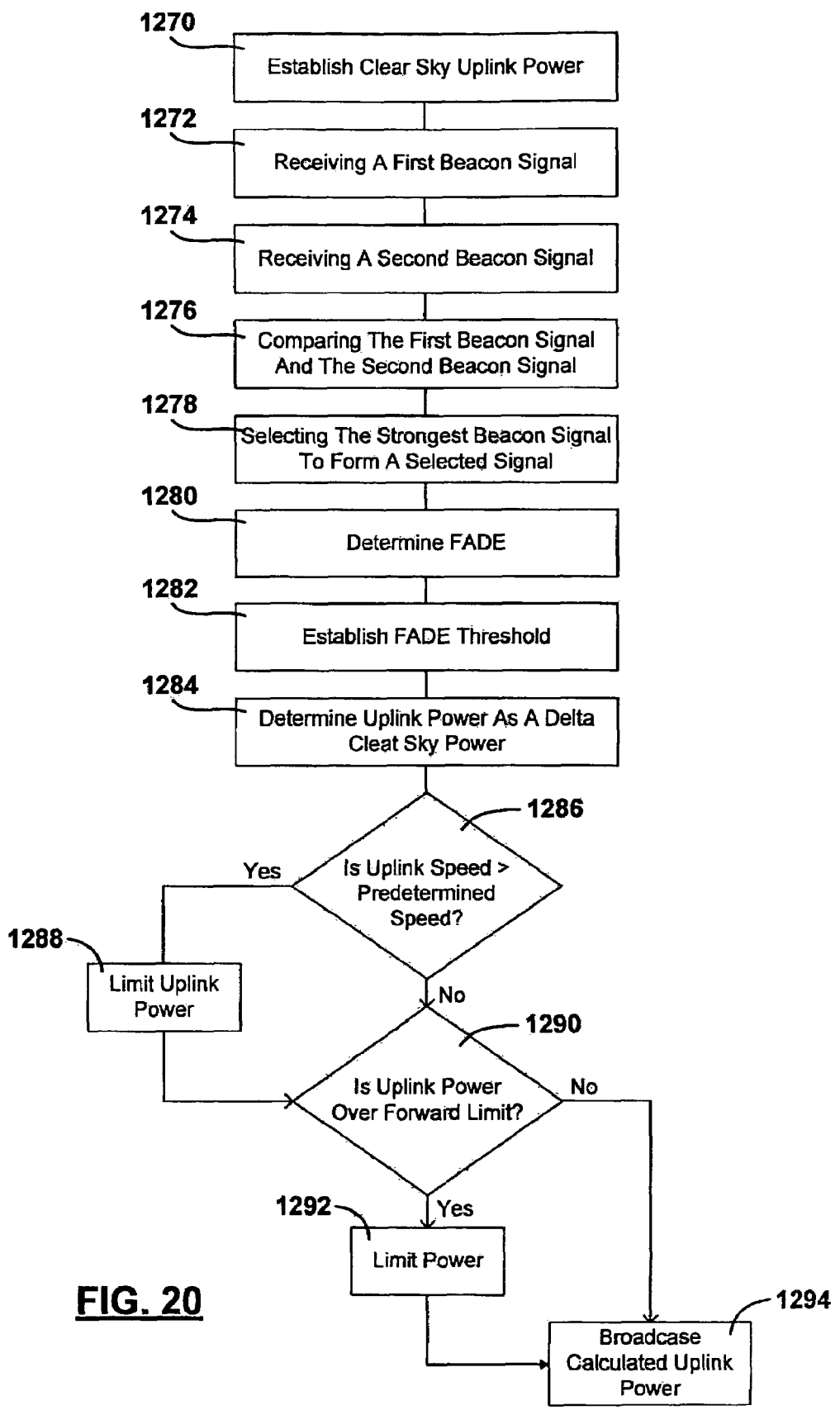
FIG. 20 is a flowchart illustrating a method for controlling uplink power.

Referring now to FIG. 20, a method for changing the uplink power is set forth. It should be noted that the uplink power applies to the primary site, the diverse site or the central site 14. In step 1270, a clear sky uplink power is established. This is a baseline and a delta from the baseline will be determined below. In step 1272, a first beacon signal is received and converted to a first beam power signal. In step 1274, a second beacon signal is received and converted to a second beacon power signal. The beacon power signals in step 1272 and 1274 are received using the antenna 404 and the associated circuitry set forth above, including the beacon receiver and the block downconverter illustrated in FIG. 5. In step 1276, the first beacon power signal and the second beacon power signal are compared. The comparison compares the first beacon power signal and the second power beacon signal. In step 1278, the strongest powered beacon signal is selected to form a selected signal. In step 1280, the amount of fade in terms of power is determined. In step 1282, a fade threshold is established. In step 1284, the uplink power is determined as a delta (A) of the clear sky power. That is, based upon the threshold and the amount of fade, a new uplink power may be determined. The beacon power signal may be broadcast to multiple pieces of equipment. Each piece of equipment (such as those shown in FIG. 5) may then use the beacon information for various control methods. Amplifiers and block upconverters (BUC) are examples of suitable equipment to receive the beacon power signals. A suitable broadcast method is through the Ethernet connection. Each device such as the amplifier and BUC then determines a fade and an adjustment for fade. The amplifier and block upconverter act as a controller in this respect.

Once the new uplink power is determined, the uplink speed is determined in step 1286. If the uplink speed is greater than a pre-determined speed, the uplink power is limited in step 1288. The uplink speed limits how quickly the uplink power is ramp. It operates as a second layer of protection so that the high power amplifiers prevent ramping power so quickly that a large phase shift is introduced in the uplink that may cause the receivers on the ground to momentarily loose lock. Typical values of uplink speed are one to three decibels per second. After step 1288 and after step 1286 if the uplink speed is greater than the uplink speed, the uplink forward power limit is compared to the uplink powered determined in step 1284 or 1288 in step 1290. If the uplink power is over the forward limit, then the power is limited in step 1292 to the maximum power that a block upconverter should be commanded to. If the uplink power is not over the forward limit, and after step 1282 the antenna is broadcast with the calculated uplink power in step 1294.

Figure 21:
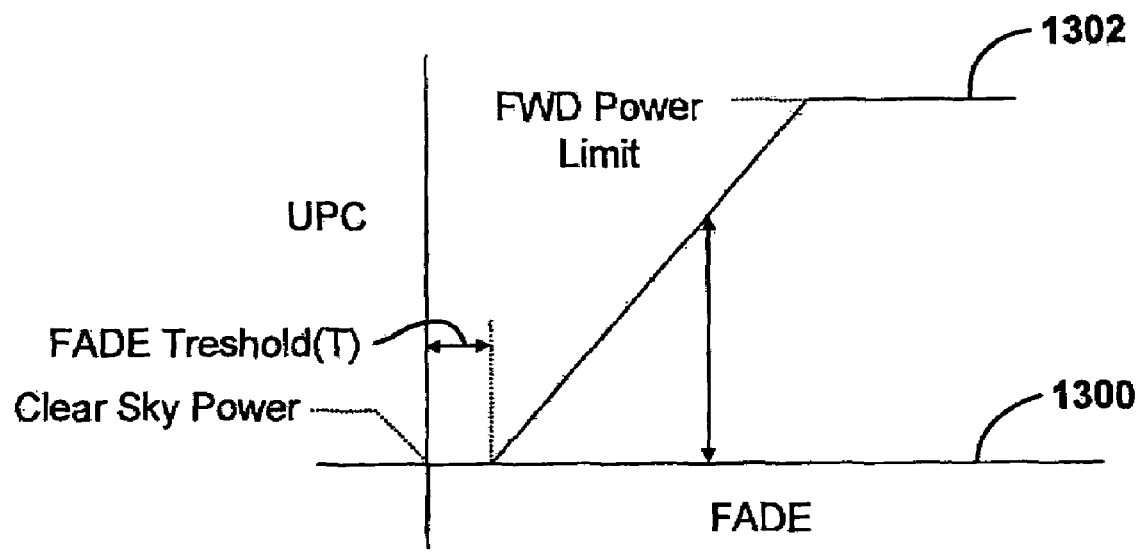
FIG. 21 is a plot of uplink power versus fade.

Referring now to FIG. 21, a plot of the uplink power versus fade is illustrated. The lower horizontal line corresponds to the clear sky power. The fade thresholds T is also illustrated. The second horizontal line 1302 illustrates the forward power limit.

It should be noted that the beacon signals in step 1272 and 1274 are locked on to the same downlink beacon signal. The uplink power compensation may be based on a unit-less constant, K, the fade, the transmit and receive signal frequency and a fade threshold T. The fade is a calculated value within the server or controller. The K value, the transmit and receive signal frequency values and the threshold values may all be user generated. These values may be experimentally determined based in part on the capabilities of the particular transmitting capabilities. The uplink power control (UPC) is best defined as:

$$UPC = K(\text{FADE-THRESHOLD})(F_{Tx}/F_{Rx})^2$$

Figure 22:
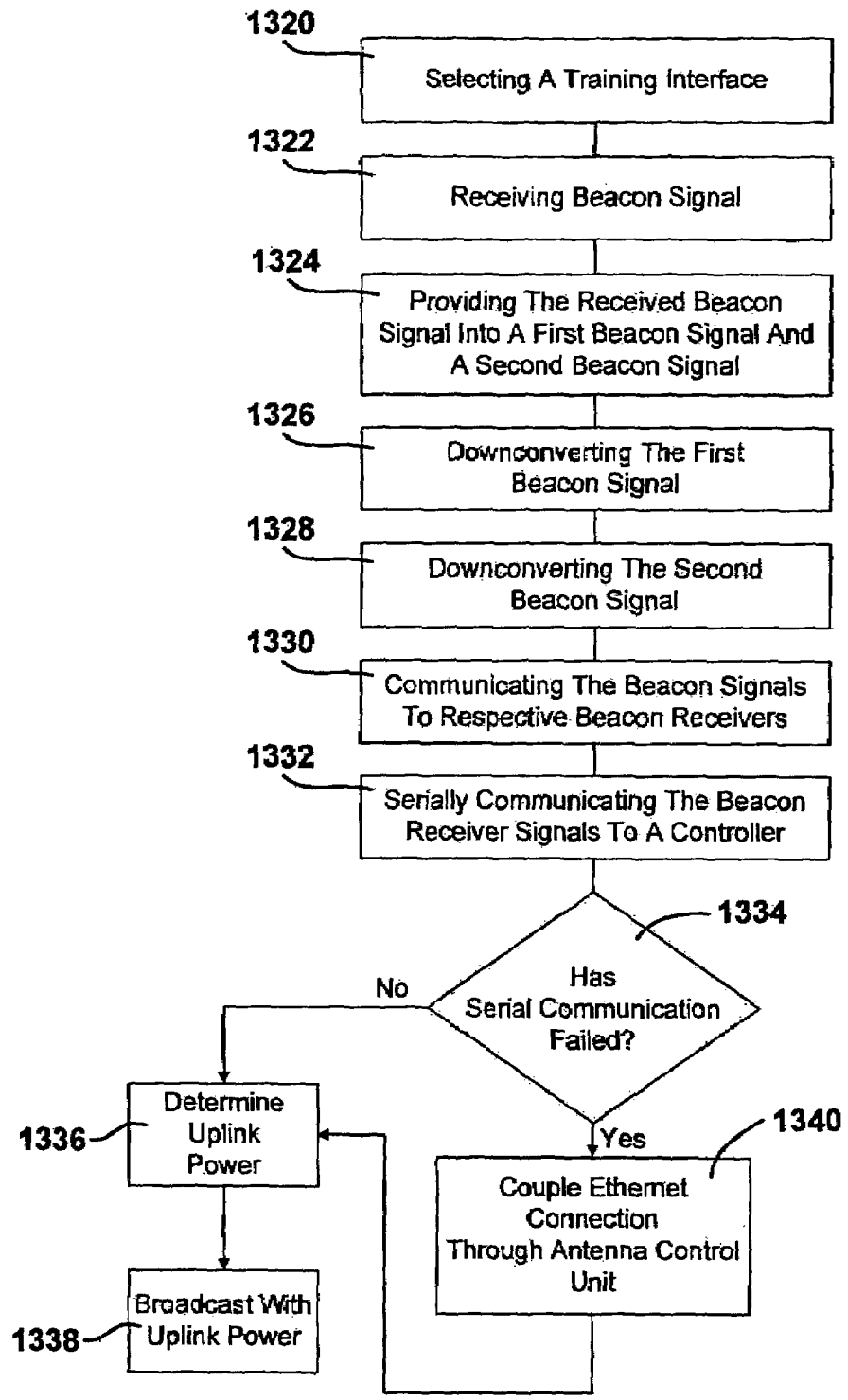
FIG. 22 is a flowchart of a method of receiving a beacon signal according to the present disclosure.

Referring now to FIG. 22, a method of operating the system is illustrated. The system may be also understood with reference to FIG. 5.

In step 1320, a tracking interface is selected. The tracking interface is illustrated as 524 and is coupled to the antenna. In step 1322, a beacon signal is received. This may include error checking, amplifying and passing the signal through a monopulse plate 532. In step 1324, the beacon signal is divided into a first beacon signal and a second beacon signal at the monopulse plate 532. The first beacon signal and the second beacon signal are passed to block downconverters 534, 536. In step 1326, the first beacon signal is block downconverted and in step 1328, the second beacon signal is block downconverted. The signals are then communicated in step 1330 to the indoor unit and to respective beacon receivers 538 and 540 of FIG. 5 through a communication line 444. In step 1332, the beacon signals are serially connected to a controller to determine uplink power. In step 1334, the serial connection is checked to determine whether or not the serial connection has failed. If the serial connection has not failed, the uplink power is determined in step 1336 and the new uplink power is used to broadcast the signal in step 1338.

If the serial connection has failed in step 1334, the antenna control unit may be coupled to each of the beacon receivers 538 and 540. The antenna control unit 542 has an Ethernet connection to the controller. The beacon signals are communicated through the Ethernet connection through the antenna control unit 542 in step 1340. The controller then determines the uplink power in step 1336 and broadcasts with that uplink power in step 1338.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification and the following claims.

What is claimed is:

1. A system comprising:
   a satellite;
   a regional site uplinking regional uplink signals to the satellite and communicating condition signals to a central site through a terrestrial communication link;
   the satellite generating regional downlink signals from the regional uplink signals; and
   said central site receiving the regional downlink signals from the satellite and terrestrially receiving the condition signals and communicating control signals for the regional site through the terrestrial communication link.

2. A system as recited in claim 1 wherein the regional uplink signals comprise a Ka band uplink signal.

3. A system as recited in claim 1 wherein the regional site controls the regional site upon interruption of the terrestrial communication link.

4. A system as recited in claim 1 wherein the terrestrial communication link is a dedicated terrestrial communication link.

5. A system as recited in claim 1 wherein the regional site comprises a regional primary site generating a regional primary uplink signal and a regional diverse site generating a regional diverse uplink signal.

6. A system as recited in claim 5 wherein the regional primary uplink signal and the regional diverse uplink signal comprises a digital television signal.

7. A system as recited in claim 5 wherein the regional primary uplink signal and the regional diverse uplink signal comprises a high-definition digital television signal.

8. A system as recited in claim 5 wherein the regional primary site and the regional diverse site are geographically separated.

9. A system as recited in claim 8 wherein the regional primary site and the regional diverse site are geographically separated by at least 25 miles.

10. A system as recited in claim 8 wherein the regional primary site and the regional diverse site are geographically separated by at least 40 miles.

11. A system as recited in claim 8 wherein the central site comprises a central primary site and a central diverse site.

12. A system as recited in claim 8 wherein the central primary site and the central diverse site are geographically separated.

13. A method comprising:
   uplinking regional uplink signals to a satellite;
   communicating condition signals to a central site through a terrestrial communication link;
   generating regional downlink signals at the satellite from the regional uplink signal;
   receiving the regional downlink signals at the central site;
   receiving the condition signals at the central site;
   generating control signals at the central site for the regional site; and
   communicating the control signals through the terrestrial communication link from the central site.

14. A method as recited in claim 13 wherein uplinking comprises uplinking the regional uplink signals from a regional primary site.

15. A method as recited in claim 14 wherein uplinking comprises uplinking the regional uplink signals from a regional diverse site.

16. A method as recited in claim 15 further comprising switching to the regional diverse site from the regional primary site and uplinking the regional uplink signals to the satellite from the regional diverse site.

17. A method as recited in claim 16 wherein switching comprises switching in response to an error condition in the regional primary site.

18. A method as recited in claim 17 further comprising detecting the error condition at the central site.

19. A method as recited in claim 17 further comprising detecting the error condition at the regional site.

20. A method as recited in claim 16 wherein switching comprises switching in response to a manual switch.

21. A method as recited in claim 13 further comprising detecting an interruption of the terrestrial communication link and controlling the regional site at the regional site.

* * * * *